US008850031B2

(12) United States Patent
Oshiba

(10) Patent No.: US 8,850,031 B2
(45) Date of Patent: Sep. 30, 2014

(54) PAIRING SYSTEM, PAIRING MANAGEMENT DEVICE, PAIRING METHOD, AND PROGRAM

(75) Inventor: Takashi Oshiba, Minato-ku (JP)

(73) Assignee: NEC Corporation, Tokyo (JP)

( * ) Notice: Subject to any disclaimer, the term of this patent is extended or adjusted under 35 U.S.C. 154(b) by 252 days.

(21) Appl. No.: 12/741,554

(22) PCT Filed: Nov. 5, 2008

(86) PCT No.: PCT/JP2008/070124
§ 371 (c)(1),
(2), (4) Date: May 5, 2010

(87) PCT Pub. No.: WO2009/060863
PCT Pub. Date: May 14, 2009

(65) Prior Publication Data
US 2010/0262696 A1    Oct. 14, 2010

(30) Foreign Application Priority Data

Nov. 7, 2007 (JP) .................. 2007-289414

(51) Int. Cl.
*G06F 15/16* (2006.01)
*G06F 17/30* (2006.01)
*G06F 3/01* (2006.01)
*H04L 29/06* (2006.01)
*H04L 29/08* (2006.01)
*H04L 9/30* (2006.01)
*H04B 7/00* (2006.01)
*H04M 1/66* (2006.01)
*H04K 1/10* (2006.01)

(52) U.S. Cl.
CPC .............. *G06F 15/16* (2013.01); *G06F 17/30* (2013.01); *G06F 3/01* (2013.01); *H04L 29/06* (2013.01); *H04L 29/08072* (2013.01); *H04L 9/3073* (2013.01); *H04B 7/00* (2013.01); *H04M 1/66* (2013.01); *H04K 1/10* (2013.01)
USPC ........................................ 709/227

(58) Field of Classification Search
CPC ......... G06F 15/16; H04L 9/3073; H04B 7/00; H04M 1/66; H04K 1/10
USPC .................... 709/227, 222; 463/37
See application file for complete search history.

(56) References Cited

U.S. PATENT DOCUMENTS 7,026,951 B2 *  4/2006  Bailey et al. ............... 340/854.3
7,377,441 B2 *  5/2008  Wiklof et al. ............ 235/472.02

(Continued)

FOREIGN PATENT DOCUMENTS

JP    2002-073565 A    3/2002
JP    2002-095047 A    3/2002

(Continued)

OTHER PUBLICATIONS

Peng et al., "Point & Connect: Intention-based Device Pairing for Mobile Phone Users", 2009.*

(Continued)

*Primary Examiner* — Ondrej Vostal
(74) *Attorney, Agent, or Firm* — Sughrue Mion, PLLC

(57) ABSTRACT

To provide a pairing system which requires no special hardware and is capable of easily pairing terminals intended by a user. A pairing management device includes a pairing control module which receives pairing requests from communication terminals and data terminals, and generates tentative pairs from the communication terminals and the data terminals which transmitted the pairing request, and a confirmation data control module which allots and transmits pair confirmation data which corresponds on one-on-one basis to the communication terminals and the data terminals forming the tentative pairs, and allows the pairing control module to update the tentative pairs to final pairs when the pairing control module receives pair alteration data corresponding to the pair confirmation data from the communication terminals or the data terminals.

27 Claims, 8 Drawing Sheets

(56) References Cited

U.S. PATENT DOCUMENTS

| | | | |
|---|---|---|---|
| 7,912,020 B2* | 3/2011 | Khasawneh et al. | 370/338 |
| 7,925,022 B2* | 4/2011 | Jung et al. | 380/270 |
| 8,041,062 B2* | 10/2011 | Cohen et al. | 381/315 |
| 8,044,928 B2* | 10/2011 | Asbury et al. | 345/156 |
| 8,142,287 B2* | 3/2012 | Podoloff | 463/39 |
| 8,213,613 B2* | 7/2012 | Diehl et al. | 380/211 |
| 2004/0039959 A1* | 2/2004 | LeCrone et al. | 714/6 |
| 2005/0083224 A1* | 4/2005 | Autret | 341/176 |
| 2005/0088275 A1* | 4/2005 | Valoteau et al. | 340/3.1 |
| 2006/0033840 A1* | 2/2006 | Diehl et al. | 348/468 |
| 2006/0083187 A1* | 4/2006 | Dekel | 370/310 |
| 2007/0032195 A1* | 2/2007 | Kurisko et al. | 455/41.2 |
| 2007/0180255 A1* | 8/2007 | Hanada et al. | 713/176 |
| 2008/0090524 A1* | 4/2008 | Lee et al. | 455/41.2 |
| 2008/0102793 A1* | 5/2008 | Ananthanarayanan et al. | 455/411 |
| 2008/0113618 A1* | 5/2008 | De Leon et al. | 455/41.2 |
| 2008/0195299 A1* | 8/2008 | Barnicle et al. | 701/115 |
| 2008/0220781 A1* | 9/2008 | Karia et al. | 455/436 |
| 2008/0312585 A1* | 12/2008 | Brukalo et al. | 604/67 |
| 2008/0320587 A1* | 12/2008 | Vauclair et al. | 726/17 |
| 2009/0016728 A1* | 1/2009 | Kindle | 398/106 |
| 2009/0034591 A1* | 2/2009 | Julian et al. | 375/220 |
| 2009/0081999 A1* | 3/2009 | Khasawneh et al. | 455/416 |
| 2009/0195407 A1* | 8/2009 | Nakano et al. | 340/825.69 |
| 2009/0222659 A1* | 9/2009 | Miyabayashi et al. | 713/156 |
| 2009/0240814 A1* | 9/2009 | Brubacher et al. | 709/227 |
| 2009/0276475 A1* | 11/2009 | Ramsey et al. | 707/204 |
| 2009/0319673 A1* | 12/2009 | Peters | 709/228 |
| 2010/0005289 A1* | 1/2010 | Devanand et al. | 713/155 |
| 2010/0024003 A1* | 1/2010 | Malledant et al. | 726/3 |
| 2010/0042733 A1* | 2/2010 | Jeffrey | 709/228 |
| 2010/0056055 A1* | 3/2010 | Ketari | 455/41.3 |
| 2010/0097238 A1* | 4/2010 | Dupielet et al. | 340/825.22 |
| 2010/0211685 A1* | 8/2010 | McDowall et al. | 709/227 |
| 2010/0255782 A1* | 10/2010 | Klemmensen | 455/41.2 |
| 2010/0278345 A1* | 11/2010 | Alsina et al. | 380/283 |
| 2010/0318795 A1* | 12/2010 | Haddad et al. | 713/168 |
| 2011/0159813 A1* | 6/2011 | Mallinson et al. | 455/41.2 |
| 2011/0159959 A1* | 6/2011 | Mallinson et al. | 463/37 |
| 2011/0210820 A1* | 9/2011 | Talty et al. | 340/5.8 |
| 2011/0215921 A1* | 9/2011 | Ben Ayed et al. | 340/539.11 |
| 2011/0246909 A1* | 10/2011 | Berrett et al. | 715/753 |
| 2011/0264035 A1* | 10/2011 | Yodfat et al. | 604/66 |

FOREIGN PATENT DOCUMENTS

| | | |
|---|---|---|
| JP | 2002-165009 A | 6/2002 |
| JP | 3865124 B2 | 7/2003 |
| JP | 2005-012380 A | 1/2005 |
| JP | 2005-328295 A | 11/2005 |
| JP | 2006-135930 A | 5/2006 |
| JP | 2006-148471 A | 6/2006 |
| JP | 2007-097009 A | 4/2007 |

OTHER PUBLICATIONS

Ghosh et al., "I, Me and My Phone: Identity and Personalization using Mobile Devices", 2007.*

Baber et al., "Social Networks and Mobile Games: The Use of Bluetooth for a Multiplayer Card Game", 2004.*

* cited by examiner

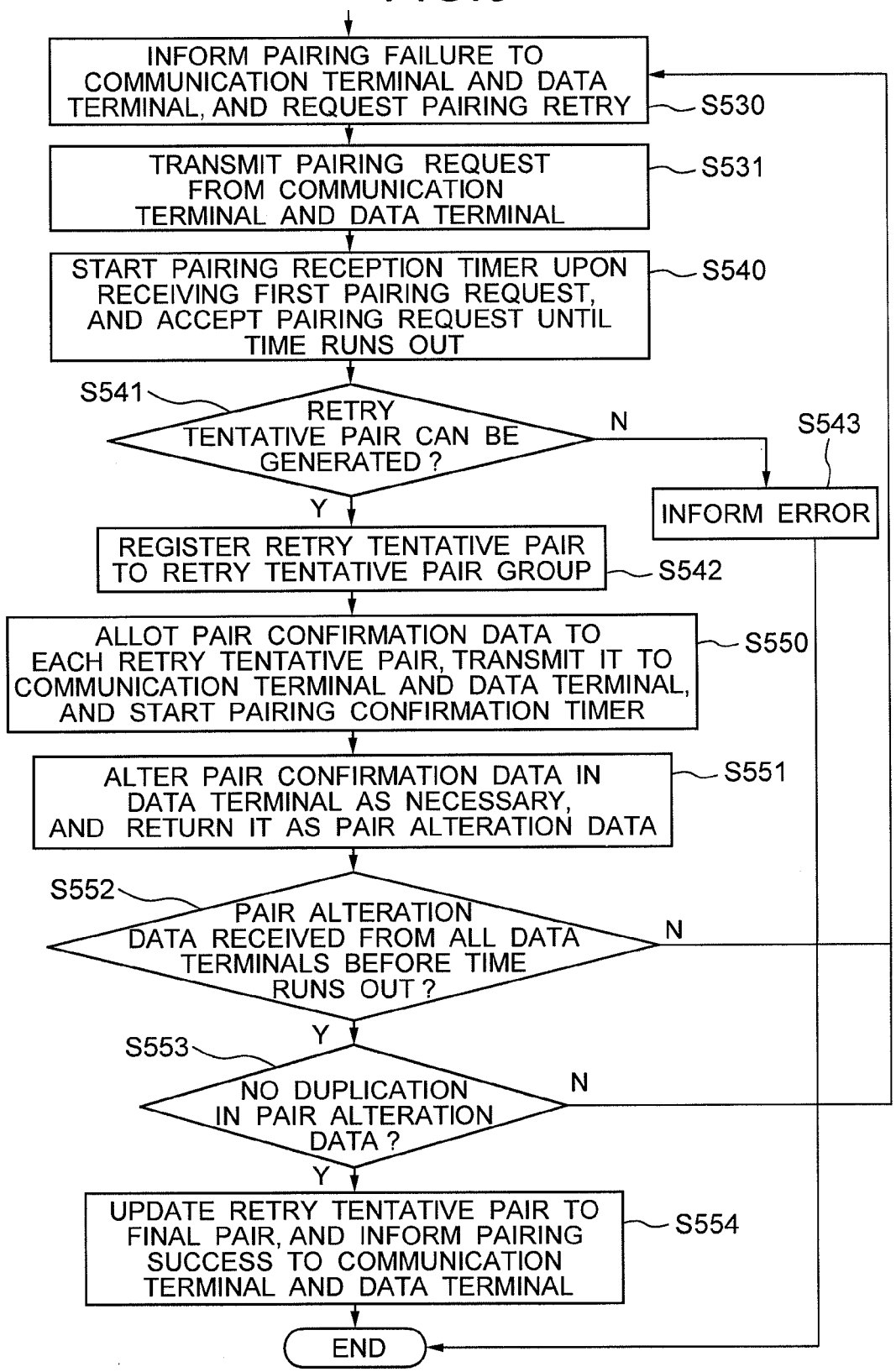

PAIRING SYSTEM, PAIRING MANAGEMENT DEVICE, PAIRING METHOD, AND PROGRAM

TECHNICAL FIELD

The present invention relates to so-called "pairing of terminals" for enabling cooperation by linking a communication terminal such as a telephone with a data terminal such as a personal computer (PC).

BACKGROUND ART

When a user of a communication terminal such as a telephone with which the user performs voice communications has the communication terminal cooperated with a data terminal such as a PC on one-on-one basis, it is called "pairing". Through pairing the communication terminal with the data terminal, the voice communication and document data containing texts, images, and the like can be shared with other users in real time, and those can be viewed, edited cooperatively, etc.

When users each having paired communication terminal and data terminal communicate with each other via the respective communication terminals, the mutual data terminals come under a condition where those are being connected on one-on-one basis as in an ad hoc mode of radio LAN. Thus, the users can share data mutually. In that case, pairing may be done in advance and then communication may be started or pairing may also be started during the communication. It is impossible for a third party to make access to the data terminals connected mutually.

At that time, the communication terminal and the data terminal are paired necessarily on one-on-one basis, and already paired communication terminal or the data terminal is not paired with other communication terminal or data terminal unless the pairing state is released. Further, communication terminals are not paired with each other, and data terminals are not paired with each other, either.

As techniques for enabling such pairing, there are following techniques. Patent Document 1 discloses a technique with which both users having voice communication by using communication terminals input terminal discriminating information such as the telephone number of the own communication terminals to the data terminals to pair the communication terminal and the data terminal so as to start data sharing between the data terminals of the both users.

In Patent Documents 2-7, disclosed are methods for pairing radio devices having a short-distance communication function such as Bluetooth or wireless USB with each other. Patent Document 2 is a method which makes it easy to select a radio device to be paired among a great number of radio devices. First, a radio device that is trying to find a radio device increases output of radio waves for discovering the radio device gradually, and the discovered radio device and the reached range of the radio waves at that point are stored in a corresponding manner. Then, each of the discovered radio devices and the reached ranges are displayed in a corresponding manner for allowing the user to select the radio device to be paired.

The technique disclosed in Patent Document 3 is targeted at simplifying the pairing work of a television receiver set and an imaging device. Terminal discriminating information of the television receiver set is displayed on a screen of the television receiver set. When a user picks it up with the imaging device, the terminal discriminating information extracted from the picked up video is coded along with the discriminating information of the imaging device. Then, it is transmitted to the television receiver set by radio communication, and authentication and pairing are conducted. With the technique disclosed in Patent Document 4, first, PIN codes are exchanged mutually by using an infrared communication function between devices having a radio communication function using radio waves and a radio communication function using infrared rays, then authentication and pairing are conducted with the radio communication function using radio waves by utilizing the PIN codes which have already been exchanged.

Patent Document 5 discloses a communication device which performs radio communication with an electronic camera after conducting authentication by comparing a PIN code received from the electronic camera with a PIN code inputted by a user. Patent Document 6 discloses a technique with which a slave device and a master device mutually exchange IDs to mutually select and register a pairing partner. Patent Document 7 discloses a technique which adjusts transmission intervals of beacons which are exchanged mutually between devices for pairing.

Patent Document 1: Japanese Unexamined Patent Publication 2005-012380
Patent Document 2: Japanese Patent No. 3865124
Patent Document 3: Japanese Unexamined Patent Publication 2006-135930
Patent Document 4: Japanese Unexamined Patent Publication 2002-073565
Patent Document 5: Japanese Unexamined Patent Publication 2002-095047
Patent Document 6: Japanese Unexamined Patent Publication 2005-328295
Patent Document 7: Japanese Unexamined Patent Publication 2006-148471

DISCLOSURE OF THE INVENTION

Problems to be Solved by the Invention

A first issue of the related techniques is that a pairing work cannot be easily done since the pairing work imposes load on the user. The technique of Patent Document 1 requires the user having voice communication to input the telephone number of the own communication terminal to the data terminal for a pairing work. Input of the telephone number itself is a troublesome work, and there may be cases where the user needs to go through a complicated work for finding the number when the user does not remember the own telephone number. Input of the PIN code in Patent Document 5 has the same issue.

A second issue of the related techniques is that it is not possible to know whether or not pairing can be done with the intended terminal until completing the pairing work. With the techniques of Patent Document 1 and Patent Document 5, it is not possible to become aware of being paired with an unintended terminal due to a mis-input until the pairing is completed and data sharing is started, even if a wrong telephone number or a wrong PIN code is inputted to the data terminal.

Further, with the technique disclosed in Patent Document 2, while each of the discovered radio devices is displayed by being classified depending on the levels of the reached range of the radio waves, there is a possibility of mis-selecting a device that is not intended by the user if there are a plurality of radio devices displayed in a single level (equal reached range). In this case, it is also impossible to become aware of being paired with an unintended terminal until completing the pairing.

A third issue of the related techniques is that when the first pairing fails, the success probability of pairing of the second-time retry and thereafter cannot be increased. With the techniques of Patent Document 1 and Patent Document 5, there is no other way but to re-input the number when the pairing fails because a wrong number is inputted to the data terminal. Thus, when the user cannot input a correct number, particularly when the user memorizes a wrong number, the same pairing failure is to be repeated.

A fourth issue of the related techniques is that the system cannot be built with a low price, since terminals which do not have special hardware such as a short-distance communication and camera cannot be paired. The techniques of Patent Documents 2-7 require the short-distance communication function such as Bluetooth or wireless USB. Further, the technique of Patent Document 3 requires a television receiver set and an imaging device, and the technique of Patent Document 4 requires a radio communication function using infra-red rays and a radio communication function using radio waves separately. Thus, it is not possible to overcome each of the above-described issues even when the techniques of Patent Documents 2-7 are combined with the technique of Patent Document 1.

An exemplary object of the present invention is to provide a pairing system, a pairing management device, a pairing method, and a program, which require no special hardware and are capable of easily pairing terminals intended by users, and capable of easily retrying the pairing even when it fails.

Means for Solving the Problems

In order to achieve the foregoing object, the pairing system according to an exemplary aspect of the invention is a pairing system which enables cooperation of communication terminals with data terminals on one-on-one basis in a network system in which a plurality of communication terminals, a plurality of data terminals, and at least one pairing management device are connected mutually, wherein: each of both the communication terminals and the data terminals includes an input-output module and a pairing request module which transmits a pairing request to the pairing management device; the pairing management device includes a pairing control module which receives the pairing requests from the communication terminals and the data terminals, and generates tentative pairs from the communication terminals and the data terminals which transmitted the pairing requests, and a confirmation data control module which allots and transmits pair confirmation data which corresponds on one-on-one basis to the communication terminals and the data terminals forming the tentative pairs; the input-output modules of both the communication terminals and the data terminals forming the tentative pairs output the pair confirmation data, respectively; the pairing request module of at least either the communication terminals or the data terminals forming the tentative pairs include a transmission section which transmits pair alteration data corresponding to the pair confirmation data to the pairing management device; and when the pairing control module in the pairing management device receives the pair alteration data from the communication terminals or the data terminals forming the tentative pairs, the tentative pairs are updated to final pairs.

In order to achieve the foregoing object, the pairing management device according to another exemplary aspect of the invention is a pairing management device which enables cooperation of communication terminals with data terminals on one-on-one basis in a network system in which a plurality of communication terminals, a plurality of data terminals, and at least one pairing management device are connected mutually, and the pairing management device includes: a pairing control module which receives pairing requests from the communication terminals and the data terminals, and generates tentative pairs from the communication terminals and the data terminals which transmitted the pairing requests; and a pair confirmation data control module which allots and transmits pair confirmation data which corresponds on one-on-one basis to the communication terminals and the data terminals forming the tentative pairs, wherein when the pairing control module receives pair alteration data from the communication terminals or the data terminals forming the tentative pairs, the tentative pairs are updated to final pairs.

In order to achieve the foregoing object, the pairing management program according to still another exemplary aspect of the invention is a program causing a computer, which forms a pairing management device that enables cooperation of communication terminals with data terminals on one-on-one basis in a network system in which a plurality of communication terminals, a plurality of data terminals, and at least one pairing management device are connected mutually, to execute: processing which receives the pairing requests from the communication terminals and the data terminals, and generates tentative pairs from the communication terminals and the data terminals transmitted the pairing requests; processing which allots and transmits pair confirmation data which corresponds on one-on-one basis to the communication terminals and the data terminals forming the tentative pairs; and processing which updates the tentative pairs to final pairs, upon receiving the pair alteration data from the communication terminals or the data terminals forming the tentative pairs.

In order to achieve the foregoing object, the pairing method according to still another exemplary aspect of the invention is a pairing method which enables cooperation of communication terminals with data terminals on one-on-one basis in a network system in which a plurality of communication terminals, a plurality of data terminals, and at least one pairing management device are connected mutually, and the method includes: a pairing request step in which the communication terminals and the data terminals transmit pairing requests to the pairing management device; a tentative pair generating step in which the pairing management device receives the pairing requests from the communication terminals and the data terminals, and generates tentative pairs from the communication terminals and the data terminals transmitted the pairing requests; a pair confirmation data transmitting step in which the pairing management device allots and transmits pair confirmation data which corresponds on one-on-one basis to the communication terminals and the data terminals forming the tentative pairs; a pair confirmation data output step in which the communication terminals and the data terminals forming the tentative pairs receive and output the pair confirmation data; a pair alteration data transmitting step in which either the communication terminals or the data terminals forming the tentative pairs transmit pair alteration data corresponding to the pair confirmation data to the pairing management device; and a final pair update step in which the pairing management device updates the tentative pairs to final pairs, when the pairing control module in the pairing management device receives the pair alteration data from the communication terminals or the data terminals forming the tentative pairs.

Effects of the Invention

The present invention can provide the pairing system, the pairing management device, the pairing method, and the program, which require no special hardware and are capable of easily pairing terminals intended by users, and capable of easily retrying the pairing even when it fails.

BEST MODES FOR CARRYING OUT THE INVENTION

First Exemplary Embodiment

FIG. 1 is a block diagram showing a network system 1 according to a first exemplary embodiment of the invention. In the network system 1, a pairing management device 100, communication terminals 200a, 200b, - - - and data terminals 300a, 300b, - - - are connected mutually to a network 2.

FIG. 2 is a block diagram showing each of the structures of the pairing management device 100, the communication terminal 200, and the data terminal 300 disclosed in FIG. 1. A plurality of numbers of the communication terminals 200a, 200b, - - - shown in FIG. 1 all have the same internal structure, so that those are called in general the communication terminals 200 and only one terminal is illustrated in FIG. 2. Similarly, the data terminals 300a, 300b, - - - are called in general the data terminals 300 and only one terminal is illustrated in FIG. 2. Further, the communication terminal 200 and the data terminal 300 are simply called the terminals as a general term.

As shown in FIG. 2, the pairing management device 100 is a computer device connectable to the network 2, and it is configured with a pairing control module 101, a pair confirmation data control module 102, a pairing information storage device 103, a pair confirmation data storage device 104, and a timer 105. The pairing control module 101 receives a pairing request from each of the communication terminals 200 and the data terminals 300, and executes processing for pairing the communication terminals 200 and the data terminals 300 based on time differences between the received hours. Hereinafter, a set of the paired communication terminal 200 and data terminal 300 is called a pair.

At that time, the pairing management device 100 does not immediately finalize the pair. The pairing management device 100 once generates a tentative pair as a candidate based on the pairing request, transmits information of the generated tentative pair to the corresponding communication terminal and data terminal to let the user confirm the tentative pair, and then finalizes the tentative pair as a final pair at this point. Details of this processing will be described later.

The pair confirmation data control module 102 allots different pair confirmation data to each of the tentative pairs generated by the pairing control module 101. The pair confirmation data may be considered to be texts, still images, voice, moving images, and the like, but not limited only to those. A specific example of the pair confirmation data will be described later.

FIG. 3 is a block diagram showing the structures of the data stored in the pairing information storage device 103 and in the pair confirmation data storage device 104 disclosed in FIG. 2. As shown in FIG. 3, the pairing information storage device 103 stores the data of a plurality of pairing requests 400, a plurality of tentative pair groups 410, a plurality of retry tentative pair groups 420, and a plurality of final pairs 430.

The pairing request 400 is the data of the pairing request transmitted from the terminals 200 and 300, and the pairing request 400 is temporarily stored in the pairing information storage device 103. The data of the pairing request 400 contains data of a request type 401, a terminal type 402, a terminal identifier 403, and received time 404. The request type 401 is the data showing the type of the pairing request, i.e., an identifier for identifying whether it is the first pairing request or the pairing request at the time of retry. For example, it is the data expressed with values such as "simultaneous push" for the first pairing request or "long push" or "rhythm push" for the pairing request of the retry. The terminal type 402 is the data showing whether the terminal that has transmitted the pairing request is the communication terminal 200 or the data terminal 300. The terminal identifier 403 is the identifier for respectively identifying each of the communication terminals 200 and the data terminals 300, and it is the data set respectively for identifying the communication terminals 200 and the data terminals 300, such as an IP address, machine name telephone number, and SIP URI.

The received time 404 is the time data when the pairing management device 100 receives the pairing request from the communication terminal 200 and the data terminal 300, and it contains a plurality of sets of data of a button operation type 405 and an operation relative hour 406. The button operation type 405 is the data for discriminating whether the time in the operation relative hour 406 is the time at which the user pushed the pairing execution button or the time at which the user released the hand from the pairing execution button. The operation relative time 406 is the data of the time at which the user pushed the pairing execution button or the time at which the user released the hand from the pairing execution button.

The tentative pair group 410 contains the data of a plurality of tentative pairs 411 which show a plurality of pairs of the communication terminals 200 and the data terminals 300 as the pair candidates which are generated based on the pairing requests received in a same pairing reception period of the pairing requests by the first "simultaneous push". The data of a plurality of tentative pairs 411 generated based on the pairing requests received during different pairing reception periods are classified as different tentative pair groups 410. The individual pairing reception period is typically very short such as one second. Thus, after several seconds from a reception of a single pairing request, for example, i.e., in a case where another pairing request is received after a pairing period has passed, the two communication terminals 200 which have transmitted the pairing request and the data terminal 300 are not to become the targets of the tentative pair 411 as the pair candidate. In other words, those terminals are not paired.

The tentative pair 411 is the data expressing the pair candidate, and contains a communication terminal identifier 412, a data terminal identifier 413, pair confirmation data 414, and pair alteration data 415. The communication terminal identifier 412 is the data of the identifier for identifying a plurality of communication terminals 200 configuring the tentative pairs 411. A values corresponding to the communication terminal 200 is copied from the data of the terminal identifier 402 contained in the data of the pairing request 400, and the copied data is used as the data of the communication terminal identifier 412. The data terminal identifier 413 is the data of the identifier for identifying the data terminal 300 configuring the tentative pair 411. A value corresponding to the data terminal 300 is copied from the data of the terminal identifier 403 of the pairing request 400, and the copied data is used as the data of the data terminal identifier 413.

The pair confirmation data 414 is the data allotted to each of the tentative pairs 411, and it is the data for confirming whether or not the communication terminal 200 and the data terminal 300 as the pair candidate suit with each other. Every time the data of the tentative pair 411 is registered, the pair confirmation data different for each tentative pair 411 is allotted. The pair alteration data 415 is the data transmitted as a response indicating that the user has confirmed the pair confirmation data 414 transmitted from the pairing management device 100 to the communication terminal 200 (or the data terminal 300) owned by the user and also it is the data showing that the structure of the pair informed by the pair confirmation data 414 has been altered. That is, it is the data showing that the user has altered the other party of the pair, i.e., the data terminal 300 (or the communication terminal 200) for the communication terminal 200 (or the data terminal 300) which is the basis. The pair alteration data 440 may contain text data, still images, voice, moving images, and the like, but not limited only to those.

The retry tentative pair group 420 contains the data of a plurality of retry tentative pairs 421 which show a plurality of pairs of the communication terminals 200 and the data terminals 300 as the pair candidates which are generated based on the pairing request received in a same pairing reception period of pairing requests at the time of retry of the second time and thereafter by the "long push" and "rhythm push". The data of a plurality of retry tentative pairs 421 generated based on the pairing requests for retry received during different pairing reception period are classified as different retry tentative pair groups 420. The individual pairing reception period at the time of retry is typically very short such as one second. Thus, after several seconds from a reception of a single pairing request, for example, i.e., in a case where another pairing request is received after a pairing period has passed, the two communication terminals 200 which have transmitted the pairing requests and data terminals 300 are not to become the targets of the tentative pairs 411 as the pair candidates at the time of retry. In other words, those terminals are not paired.

The retry tentative pair 421 is the data expressing the tentative pair candidate, and contains a communication terminal identifier 422, a data terminal identifier 423, pair confirmation data 424, and pair alteration data 425. Those take up the same roles as the roles of the communication terminal identifier 412, the data terminal identifier 413, the pair confirmation data 414, and the pair alteration data 415, so that explanations thereof are omitted.

The final pair 430 is the data expressing the final pair of the communication terminal 200 and the data terminal 300 which are generated when the tentative pair is confirmed and the pairing of the communication terminal 200 and the data terminal is succeeded, and it contains a communication terminal identifier 431 and a data terminal identifier 432. The communication terminal identifier 431 is the identifier for identifying the communication terminal 200 to be a pair. The value corresponding to the communication terminal 200 forming the pair is copied from the communication terminal identifier 412 of the tentative pair 411 or the communication terminal identifier 422 of the retry tentative pair 421, and the copied data is used as the data of the communication terminal identifier 431. The data terminal identifier 432 is the identifier for identifying the data terminal 300 to be a pair. The value corresponding to the data terminal 300 forming the pair is copied from the data terminal identifier 413 of the tentative pair 411 or the data terminal identifier 423 of the retry tentative pair 321, and the copied data is used as the data terminal identifier 431.

The pair confirmation data storage device 104 stores a greater number of pair confirmation data 440 than the number of pair candidate communication terminals 200 and data terminals 300 connected to the pairing management device 100. This makes it possible to allot the pair confirmation data in a non-duplicating manner to each tentative pair 411 within the same tentative pair group 410 and each retry tentative pair 421 within the same retry tentative pair group 420 stored in the pair confirmation data storage device 104. The pair confirmation data 440 stored in the pair confirmation data storage device 104 is the data as the base for the pair confirmation data 414 allotted to the tentative pairs 411 and the pair confirmation data 424 allotted to the retry tentative pairs 421.

The timer 105 provides a timer function for waiting a request or response from the communication terminal 200 or the data terminal 300 for a specific time according to an instruction from the pairing control module 101. A specific waiting timer by the timer 105 can also be set by the pairing control module 101.

As shown in FIG. 2, the communication terminal 200 is configured with a pairing request module 211, an input-output module 212, and a communication terminal storage device 213. The communication terminal 200 may be a fixed-line phone, a mobile phone, a smart phone (mobile phone with a PDA function), an onboard terminal, and any other similar devices having a function of exchanging information with outside.

The pairing request module 211 includes a network communication function, and executes transmission of a pairing request to the pairing management device 100, reception of the pair confirmation data, and transmission of the pair alteration data. The input-output module 212 includes various kinds of input functions such as a dial key, a microphone, and others and various kinds of output functions such as a display, a speaker, and others so as to receive an operation of the terminal done by the user and performs output of the received pair confirmation data. For example, a GUI component such as a pairing execution button is displayed on a screen, and the pair confirmation data 450 is displayed on the screen or the pair confirmation data 450 is outputted with voice. For outputting the pair confirmation data 450 towards the user, it is not limited to output it with a visible display by the GUI component or by voice. As long as the pair confirmation data 450 can be provided to the user, the output method is not limited. The communication terminal storage device 213 stores the pair confirmation data 450.

The pair confirmation data 450 is acquired by copying the value corresponding to the corresponding terminal 200 (or the data terminal 300) from the pair confirmation data 414 of the tentative pair 411 or the pair confirmation data 424 of the retry tentative pair 421 stored in the pairing information storage device 103, and the copied data is used as the pair confirmation data 450. The pair confirmation data 450 is stored in the pair confirmation data storage device 104. The pair confirmation data 450 is read out from the pair confirmation data storage device 104 by the pair confirmation control module 102, transmitted to the communication terminal 200 under a control of the pairing control module 101, outputted towards the user by the input-output module 212, and utilized by the user to confirm whether or not intended pairing has been done.

As shown in FIG. 2, the data terminal 300 is formed with a pairing request module 321, an input-output module 322, and a data terminal storage device 323. The data terminal 300 may be a personal computer (PC), a portable computer (PDA), a smart phone (mobile phone with a PDA function), a multimedia terminal placed on the street, an onboard terminal, a television set with a network connecting function, a settop box with a network connecting function, a game machine with a network connecting function, and any other similar devices having a communicating function with outside.

The pairing request nodule 321 has the equivalent function as that of the pairing request module 211 of the communication terminal 200, so that explanations thereof are omitted. The input/output device 322 includes various kinds of input functions such as a mouse, a keyboard, a microphone, and others and various kinds of output functions such as a display, a speaker, and others to receive an operation of the terminal from the user and output the received pair confirmation data. For example, GUI components such as a pairing execution button and a switching button of the pair confirmation data 460 are displayed on the screen, and the pair confirmation data is displayed on the screen. Alternatively, the GUI components such as a pairing execution button and a switching button of the pair confirmation data 460 are displayed on the screen, and the pair confirmation data 450 is outputted with voice. The data terminal storage device 323 stores a plurality of the pair confirmation data 460.

The pair confirmation data 460 of the data terminal 300 is almost equivalent to the pair confirmation data 450 that is transmitted to the communication terminal 200 from the pairing management device 100. However, when there are a plurality of pieces of pair confirmation data 460, the pair confirmation data 460 displayed on the input-output module 322 is switched by an operation of the user.

FIG. 4 is a flowchart showing the processing executed by the pairing management device 100 disclosed in FIG. 1 when pairing the communication terminal 200 and the data terminal 300. Here, operations are explained assuming that the users A and B respectively pair the communication terminal 200*a* and the data terminal 300*a* owned by the user A and the communication terminal 200*b* and the data terminal 300*b* owned by the user B. Further, it is assumed the pairing under a state where the communication terminal 200*a* owned by the user A and the communication terminal 200*b* owned by the user B are in a non-call state. In the followings, explanations are provided on assumption that the input-output modules 212 and 322 display the information as a visible image on the screen. However, the input-output modules 212 and 322 may also output the information with voice.

When the user A operates the input-output module 212 of the communication terminal 200*a*, the pairing request module 211 receives the information from the input-output module 212, and displays the pairing execution button on the screen of the input-output module 212. Further, when the user A operates the input-output module 322 of the data terminal 300*a* in the same manner, the pairing request module 321 receives the information from the input-output module 322, and displays the pairing execution button on the screen of the input-output module 322.

In the same manner as that of the user A, when the user B operates the input-output modules 212 and 322 of the communication terminal 200*b* and the data terminal 300*b*, the pairing request modules 211 and 321 respectively receive the information from the input-output modules 212 and 322, and displays the pairing execution button on the screens of the input-output modules 212 and 322.

The function for displaying the pairing execution button on the screens of the input-output modules 212 and 322 can be executed by Web browser and application software such as Java (registered trademark) or Flash in mobile phones. The function in PCs can be executed by softphone in addition to the Web browser and application software and also can be executed by widget that is a light application that resides on a desktop. Further, instead of displaying the pairing execution button, it is also possible to utilize a voice guide function of IVR (Interactive Voice Responce) of a switchboard by operating the dial key in a case where the communication terminals 200*a* and 200*b* are fixed-line telephones, for example.

The user A pushes the pairing execution buttons displayed respectively on the input-output modules 212 and 322 of the communication terminal 200*a* and the data terminal 300*a* almost at simultaneous timings. Thereby, the pairing request modules 211 and 321 of the communication terminal 200*a* and the data terminal 300*a* transmit the pairing requests to the pairing control module 101, respectively. When the communication terminal 200*a* is operated very close to the data terminal 300*a*, each of the input-output modules 212 and 322 can be simultaneously operated by each hand easily, so that an error in the timings for pressing down the both pairing execution buttons can be suppressed to a short time such as within one second. Therefore, an error in the timings for both of the pairing request modules 211 and 321 to transmit the pairing requests can be suppressed to be within a short time.

The pairing control module 101 receives the pairing request from one of the communication terminals 200*a*, 200*b*, and the data terminals 300*a*, 300*b*. At the point where the pairing control module 101 receives the first (initial) pairing request, the timer 105 starts to count the time, and the pairing requests of the second time and thereafter are received until the time runs out after a preset time has passed (steps S500-510). The preset clocking time done by the timer 105 is typically an extremely short time such as one second. However, the preset count time is not limited only to that. The pairing control module 101 receives pairing requests from other terminals until the time of the timer 105 runs out (step S510). Hereinafter, the explanations will be continued on assumption that the pairing requests from all the remaining three terminals are received in step S510.

The pairing control module 101 receives the pairing requests transmitted from the four terminals 200*a*, 200*b*, and data terminals 300*a*, 300*b*, and respectively stores each of the pairing requests to the pairing information storage device 103 as the four pairing requests 400. The pairing request 400 received from the communication terminal 200*a* contains "simultaneous push" as the value of the request type 401, "communication terminal" as the value of the terminal type 402, the identifier of the communication terminal 200*a* as the value of the terminal identifier 403, and the time at which the pairing request is received from the pairing request module 211 of the communication terminal 200*a* as the value of the received time 404.

The pairing request 400 received at the pairing control module 101 from the data terminal 300*a* contains "simultaneous push" as the value of the request type 401, "data terminal" as the value of the terminal type 402, the identifier of the data terminal 300*a* as the value of the terminal identifier 403, and the time at which the pairing request is received from the pairing request module 321 of the data terminal 300*a* as the value of the received time 404. The pairing requests 400 received from the communication terminal 200*b* and the data terminal 300*b* owned by the user B also contain the same values.

The pairing control module 101 judges whether or not the tentative pairs as the pair candidates can be generated from the pairing requests 400 received during a same pairing reception time (step S511). The pairing control module 101 extracts all the requests whose value of the request type 401 is "simultaneous push" among the pairing requests 400 received during a same pairing reception time, and judges as follows.

The pairing control module 101 judges that it is possible to generate the tentative pairs as the pair candidates and advances the processing to step S512, when there are an even-number of pairing requests 400 whose value of the terminal type 402 is "communication terminal", there are an even-number of pairing requests 400 whose value of the terminal type 402 is "data terminal", and the number of the pairing requests 400 whose value of the terminal type 402 is "communication terminal" is the same as the number of the pairing requests 400 whose value of the terminal type 402 is "data terminal". In other cases, the pairing control module 101 judges that it is not possible to generate the tentative pairs, notifies occurrence of an error to each of the terminals that "pairing processing has failed, so that it is necessary to perform simultaneous push operation again", and ends the processing (step S513).

When judged that it is possible to generate the tentative pairs, the pairing control module 101 generates a single tentative pair group 410, and starts to register the tentative pairs 411 to the tentative pair group 410 (step S512). When there are a plurality of pairing requests received during the pairing reception period in step S510, the pairing control module 101 generates the tentative pairs one by one and connects those in the tentative pair group 410 to make it possible to follow a list thereof from the top to the last.

First, the pairing control module 101 generates a single tentative pair 411 as the top tentative pair, and extracts the pairing request 400 with the earliest received time 404 among the pairing requests 400 received during the pairing reception period in step S510 from the pairing information storage device 103. When the value of the terminal type 402 is "communication terminal", the pairing control module 101 copies the data corresponding to the terminal identifier 403 contained in the pairing request 400, and registers that data to the pairing information storage device 103 as the data of the communication terminal identifier 412 of the tentative pair 411. When the value of the terminal type 402 is "data terminal", the pairing control module 101 copies the data corresponding to the terminal identifier 403 contained in the pairing request 400, and registers that data to the pairing information storage device 103 as the data of the data terminal identifier 413 of the tentative pair 411.

Then, the pairing control module 101 repeats next processing until there is no more pairing request 400 that has not been processed remained in the pairing requests 400 received in the pairing reception period in step S510. Specifically, the pairing control module 101 extracts the pairing request 400 with the earliest received time 404 among the unprocessed pairing requests 400 from the pairing information storage device 103. When the terminal type 402 of the extracted pairing request 400 is "communication terminal", the pairing control module 101 searches the list of the tentative pairs 411 from the top to the last in order so as to find the one whose value of the communication terminal identifier 412 is blank. When the communication terminal identifier 412 with a blank value is discovered, the pairing control module 101 copies the data corresponding to the terminal identifier 403 of the pairing request 400 as the data of the communication terminal identifier 412 of the tentative pair 411, and registers the data to the pairing information storage device 103. When the communication terminal identifier 412 with a blank value is not discovered, the pairing control module 101 generates a single tentative pair 411 and adds the pair to the end of the list, copies the data corresponding to the terminal identifier 403 of the pairing request 400 as the communication terminal identifier 412 of the tentative pair 411, and registers the data to the pairing information storage device 103.

When the terminal type 402 of the extracted pairing request 400 is "data terminal", the pairing control module 101 searches the list of the tentative pairs 411 from the top to the last in order so as to find the one whose value of the data terminal identifier 413 is blank. When the data terminal identifier 413 with a blank value is discovered, the pairing control module 101 copies the data corresponding to the terminal identifier 403 of the pairing request 400 as the data of the data terminal identifier 413 of the tentative pair 411, and registers the data to the pairing information storage device 103. When the data terminal identifier 413 with a blank value is not discovered, the pairing control module 101 generates a single tentative pair 411 and adds the pair to the end of the list, copies the data corresponding to the terminal identifier 403 of the pairing request 400 as the data terminal identifier 413 of the tentative pair 411, and registers the data to the pairing information storage device 103.

With this, generation of the tentative pairs 411 in which the communication terminals 200 and the data terminals 300 correspond on one-on-one basis is completed. However, there is a possibility that the communication terminal 200 and the data terminal 300 of different owners may be paired as in a case of a pair formed with the communication terminal 200a and the data terminal 300b or a pair formed with the communication terminal 200b and the data terminal 300a, for example. This state is called crosswise pairing. This is a combination that is not intended by the user A and the user B. A pair confirmation action described hereinafter is conducted to avoid such state.

After completing generation of the tentative pairs 411, the pair confirmation data control module 102 receives the tentative pairs 411 generated in step S512 from the pairing control module 101, copies the pair confirmation data 440 registered in advance to the pair confirmation data storage device 104 as the pair confirmation data 414 allotted to each tentative pair 411, and allots the copied pair confirmation data 440 to the respective tentative pairs 411 (step S520). At that time, the pair confirmation data control module 102 allots different pair confirmation data 440 to each of the tentative pairs 411.

Upon receiving the pair confirmation data 440 allotted to each of the tentative pairs 411 from the pair confirmation data control module 102, the pairing control module 101 transmits the allotted pair confirmation data 414 to the communication terminal specified by the communication terminal identifier 412 of each tentative pair 411. Further, in addition to the allotted pair confirmation data 414 (referred to as main data 414m hereinafter), the pairing control module 101 also transmits, to the data terminal specified by the data terminal identifier 413 of each tentative pair 411, the pair confirmation data 414 (referred to as sub-data 414s hereinafter) allotted to all the other tentative pairs 411 within the tentative pair group 410 that includes the tentative pair 411. At that time, dummy data which is not allotted to any of the tentative pairs may be included in the sub-data 414s.

When transmitting the pair confirmation data, the pairing control module 101 starts to count the time by using the time 105 for the pairing confirmation. The time out value set in the timer 105 for the pairing confirmation is typically about 5-10 seconds considering the time required for the user to think and operate. However, the value is not limited only to that.

In the communication terminal 200a, the pair confirmation data 414 received by the pairing request module 211 is stored in the communication terminal storage device 213 as the pair confirmation data 450 and displayed on the screen of the input-output module 212. Further, in the data terminal 300a, the pair confirmation data 414 (includes both the main data 414m and the sub-data 414s) received by the pairing request module 321 is stored in the data terminal storage device 323 as the pair confirmation data 460 and displayed on the screen of the input-output module 322. When displaying the pair confirmation data 414 on the screen of the input-output module 322, the main data 414m included in the pair confirmation data 414 may be displayed in a large size on the center of the screen, and the sub-data 414s included in the pair confirmation data 414 may be displayed in a small size next to the main data.

The user A compares the pair confirmation data 450 displayed on the screen of the input-output module 212 of the communication terminal 200 with the main data 414m of the pair confirmation data 460 displayed on the screen of the input-output module 322 of the data terminal 300. When the both are consistent, the user A performs an operation of "pair finalization" by the input-output module 322 of the data terminal 300 directly. When the user A performs the operation of "pair finalization" by the input-output module 322 of the data terminal 300, the input-output module 322 of the data terminal 300 transmits the transmitted pair confirmation data 414 as it is to the pairing control module 101 for notifying that pairing of the communication terminal 200a and the data terminal 300a is confirmed by the user A.

When the both are inconsistent, the user A performs a switching operation of the data displayed on the screen by the input-output module 322 of the data terminal 300 to switch the displayed data to the sub-data 414s, and searches the data that matches with the pair confirmation data 450. When the consistent data is discovered, the user A performs an operation of "pair finalization" by the input-output module 322 of the data terminal 300. When the user A performs the operation of "pair finalization" by the input-output module 322 of the data terminal 300, the pairing request module 321 transmits the pair confirmation data 460 that is currently being displayed as the pair alteration data 415 to the pairing control module 101 by corresponding to the operation of the "pair finalization" (step S521).

The user B performs completely the same processing on the communication terminal 200b and the data terminal 300b as the processing performed by the user A. In this case, when the user B alters the pair confirmation data 460 to the pair alteration 415 by the input-output module 322 of the data terminal 300b, the pairing request module 321 of the data terminal 300b transmits the pair alteration data 415 to the pairing control module 101 by corresponding to the operation of "pair finalization" done by the input-output module 322 of the user B (step S521). Switching of the data and the operation of "pair finalization" can also be executed by a simple operation such as pressing a button displayed on the screen.

When receiving the pair alteration data 415 from the pairing request module 321 of the data terminal 300a or 300b, the pairing control module 101 stores the pair confirmation data 415 to the pairing information storage device 103, and checks whether or not the pair confirmation data 415 has been received from the data terminal specified by the data terminal identifier 413 of each tentative pair 411 before the time for the pairing confirmation counted by the timer 105 runs out (step S522). When the pair alteration data 415 is received either from the data terminal 300a or 300b, the pairing control model 101 advances the processing to step S523. If there is even one data terminal from which the data is not received, the pairing control module 101 advances the processing to step S530.

When the pair alteration data 415 is received either from the data terminal 300a or 300b, the pairing control model 101 checks whether or not there is even one duplicated data for all the correction data 415 within the tentative pair group 410 stored in the pairing information storage device 103 (step S523). When there is duplication, it means that crosswise pairing is generated in the tentative pairs. Thus, if there is no duplication, the pairing control module 101 advances the processing to step S524. If there is duplication, the pairing control module advances the processing to step S530.

When there is no duplication in a plurality of pair alteration data 415, the pairing control module 101 performs processing for updating the tentative pairs 411 to the final pairs 430 (step S524). At that time, the pairing control module 101 first compares all the communication terminal identifiers 412 within the tentative pair group 410 with all the communication terminal identifiers 431 within the final pairs 430 to check whether or not there is duplication, and eliminates the corresponding final pair 430 if there is duplication. Subsequently, the pairing control module 101 compares all the data terminal identifiers 413 within the tentative pair group 410 with all the data terminal identifiers 432 within the final pairs 430 to check whether or not there is duplication, and eliminates the corresponding final pair 430 if there is duplication.

Then, the pairing control module 101 generates the same number of final pairs 430 as the number of the tentative pairs 411 within the tentative pair group 410, copies the communication terminal identifiers 412 of each tentative pair 411 and the data of the data terminal identifiers 413 as the communication terminal identifiers 431 and the data terminal identifiers 432 of the final pair 430, and registers the data to the pairing information storage device 103. At that time, the pairing control module 101 necessarily updates the communication terminals 200 and the data terminals 300 to which the same pair alteration data 415 is transmitted to the final pairs 430, so that the crosswise pairing state can be amended. Therefore, the communication terminals 200 and the data terminals 300 in the combinations intended by the user can be generated as the final pairs 430.

Then, the pairing control module 101 informs all the communication terminals and the data terminals specified by the communication terminal identifiers 412 and the data terminal identifiers 413 of each tentative pair 411 that the pairing has been succeeded (step S524). At this time, the pairing control module 101 may also transmit the data terminal identifier 413 of the paired data terminal to the respective communication terminal, and the communication terminal identifier 412 of the paired communication terminal to the respective data terminal along therewith. At last, the pairing control module 101 eliminates the tentative pair group 410 including all the contained tentative pairs 411. Thereby, the pairing operation is completed.

In a case where "pair confirmation" or "pair alteration data" is not received from any of the data terminals 300a and 300b in step S522 described above within the set time of the timer 105 or there is even one duplication for the correction data 415 in step S523 described above, the pairing control module 101 informs all the communication terminals and the data terminals specified by the communication terminal identifiers 412 and the data terminal identifiers 413 of each tentative pair 411 that it is necessary to retry the pairing operation by long push since the pairing has failed, and starts the retry of the pairing operation (step S530).

At this time, the pairing control module 101 also informs the time length of the long push in the retry to each data terminal. The time length of the long push is set to be in different lengths for each of the data terminals. The time length of the long push set to be different for each data terminal can be set in random numbers or may be set geometrical progression sequence manner. For example, assuming that the initial value is 3 seconds and the offset value is 2 seconds, it is possible to set the length as 3 seconds for the first data terminal to be informed, 5 seconds (3+2=5) for the second data terminal, 7 seconds (5+2=7) for the third terminal, etc.

FIG. 5 is a flowchart showing details of the processing executed by the pairing management device 100 when retrying the pairing operation of the communication terminals 200 and the data terminals 300 disclosed in step S530 of FIG. 4.

When the pairing request modules 211 of the communication terminals 200a, 200b and the pairing request modules 321 of the data terminals 300a, 300b receive the notification of the retry of the pairing operation from the pairing control module 101, the input-output modules 212 of the communication terminals 200*a* and 200*b* display the pairing execution button and the long push time required for the retry on the screen thereof and the input-output modules 322 of the data terminals 300*a* and 300*b* display those on the screen thereof under a control of the pairing request modules 211 and 322. The user A pushes the pairing execution buttons displayed on the screen of the input-output module 212 of the communication terminal 200*a* and on the display of the input-output module 322 of the data terminal 300*a* almost simultaneously by adjusting the timings. While keeping the pushed state, the user A waits for the length of the long push time informed in step S530. Thereafter, the user stops the long push of the buttons almost simultaneously by adjusting the timings. The user B also performs the same operation for the input-output module 212 of the communication terminal 200*b* and the input-output module 322 of the data terminal 300*b*.

At that time, it is kind for the users if the display of the time for the long push informed on the screen of the input-output module 322 is presented as "please keep pushing for 5 seconds", for example, and the time is displayed in a subtraction manner such as "4 more seconds", "3 more seconds" while keeping the pushed state. When the users A and B stop the long push of the buttons, each of the pairing request module 211 and the pairing request module 321 transmits the pairing request to the pairing control module 101 (step S531).

The pairing control module 101 receives those pairing requests, and performs the same processing as the one executed in step S510 described above (step S540). However, data of "long push" is stored as the value of the request type 401 in the pairing requests 400. Further, two sets of data of the button operation type 405 and the operation relative time 406 are added to each request type 401. Data of "button down" is stored in the button operation type 405 of the first set, and "0" is stored in the operation relative time 406. Data of "button up" is stored in the button operation type 405 of the second set, and data of the time difference between the time at which the pairing execution button is pushed and the time at which the button is released in the terminal is stored in the operation relative time 406.

Subsequently, the pairing control module 101 judges whether or not it is possible to generate retry tentative pairs from the pairing requests received during the pairing reception period in step S540 (step S541). At that time, the pairing control module 101 extracts all the requests whose value of the request type 401 is "long push" among the pairing requests 400 received during the pairing reception period.

For each of the extracted pairing requests 400, the pairing control module 101 calculates the time that is obtained by subtracting the value of the operation relative time 406 of the second set from the received time 404, and those with the error in the time between each of the pairing requests 400 equal to or less than a preset value are put into a group. The error herein is an extremely short time such as about 1 second, however, the value is not limited only to that.

With "simultaneous push", the pairing control module 101 determines whether or not to register the tentative pair with a single judgment standard which is the simultaneousness of the reception time of the pairing requests. With "long push", the pairing control module 101 determines whether or not to register the tentative pair with two judgment standards which are the simultaneousness of the time at which the buttons are pushed and the simultaneousness of the time at which the buttons are released. Thus, "long push" requires slightly more complicated works for the operation thereof than the case of "simultaneous push". However, with "long push", it is necessary to clear both of the two judgment standards, so that the probability of having crosswise pairing can be decreased.

Further, the pairing control module 101 performs following processing for each group. The pairing control module 101 judges that it is possible to generate the tentative pairs and advances the processing to step S542, when there are an even-number of pairing requests 400 whose value of the terminal type 402 is "communication terminal", there are an even-number of pairing requests whose value of the terminal type 402 is "data terminal", and the number of the pairing requests 400 whose value of the terminal type 402 is "communication terminal" is the same as the number of the pairing requests 400 whose value of the terminal type 402 is "data terminal". In other cases, the pairing control module 101 judges that it is not possible to generate the tentative pairs, and advances the processing to step S543.

When it is possible to generate the tentative pairs in step S541, the pairing control module 101 performs the processing of step S542 to step S554 on the group, which is same as the processing of step S512 to step S524. However, the tentative pair group 410—the pair alteration data 415 are changed in this case to the retry tentative pair group 420—the pair alteration data 425. Further, in a case where "pair confirmation" or "pair alteration data 415" is not received either from the data terminal 300*a* or 300*b* within the set time of the timer 105 in step S552 or in a case where there is even one duplication for the pair alteration data 415 in sep S553 described above, the pairing control module 101 returns to step S530 to execute retry of the pairing again.

When it is not possible to generate the tentative pairs in step S541, the pairing control module 101 informs the error to each terminal that "pairing processing has failed" (step S543), and ends the processing.

FIG. 6 and FIG. 7 are illustrations of images showing operations and transition of the screens in the communication terminal 200 and the data terminal 300 regarding the flowcharts shown in FIG. 4 and FIG. 5. FIG. 6 and FIG. 7 are illustrated assuming a case where the input-output modules 212 and 321 display the information by using a display. However, the input-output modules 212 and 321 may output the information with voice. As shown in FIG. 6A, the user A intends to pair the communication terminal 200*a* with the data terminal 300*a* owned by the user A oneself.

As shown in step S500, a pairing execution button 602 is displayed on a display 601 included in the input-output module 212 of the communication terminal 200*a*. Further, a pairing execution button 612 is also displayed on a display 611 included in the input-output module 322 of the data terminal 300*a*. The user A simultaneously pushes the pairing execution button 602 of the communication terminal 200*a* and the pairing execution button 612 of the data terminal 300*a*.

Thereby, as shown in FIG. 6B, an illustration 621 is displayed on the display 601 of the communication terminal 200*a* as the pair confirmation data 450. An illustration 631 is displayed on the display 611 of the data terminal 300*a* as the main data 414*m* of the pair confirmation data 460. Further, image switching buttons 632, 633 for switching the displayed illustration 631 to the sub-data 414*s*, an OK button 634 to be described later, and a cancel button 635 for stopping the pairing work are also displayed.

The user A can intuitively know that no crosswise pairing is generated and the communication terminal 200*a* and the data terminal 300*a* are to be paired as intended, through checking that the illustration 621 and the illustration 631 are the same (illustrations of a dog).

When the user A confirming that fact pushes the OK button 634 displayed on the bottom section of the display 611 of the data terminal 300a, the tentative pair of the communication terminal 200a and the data terminal 300a is updated as the final pair. When the cancel button 635 is pushed here, the pairing request module 321 of the data terminal 300a transmits a signal for stopping the pairing work to the pairing control module 101.

As shown in FIG. 6C, the identifier of the paired data terminal 300a is displayed on the display 601 of the communication terminal 200a. Further, the identifier of the paired communication terminal 200a is displayed on the display 611 of the data terminal 300a. This makes it possible to intuitively confirm that the communication terminal 200a and the data terminal 300a are paired as intended.

As shown in FIG. 7A, as in the case where the user A tries to pair the communication terminal 200a with the data terminal 300a owned by the user A oneself, the user B intends to pair the communication terminal 200b with the data terminal 300b owned by the user B oneself. The user A simultaneously pushes the pairing execution button 602a displayed on the communication terminal 200a and the pairing execution button 612a displayed on the display of the data terminal 300a. At almost the same timing as this, the user B simultaneously pushes a pairing execution button 602b displayed on the communication terminal 200b and a pairing execution button 612b displayed on the display of the data terminal 300b. When the user A and the user B execute the simultaneous pushing operations at almost the same timing, the communication terminal 200a and the data terminal 300b as well as the communication terminal 200b and the data terminal 300a are formed as the tentative pairs, respectively, which are in crosswise pairing state.

As a result, as shown in FIG. 7B, the illustration 621 displayed on the display 601 of the communication terminal 200a of the user A and the illustration 631 displayed on the display 611 of the data terminal 300a are different illustrations (illustration of a dog and illustration of a cat). The illustration 621 displayed on the display of the communication terminal 200b of the user B and the illustration 631 displayed on the display 611 of the data terminal 300b are also different illustrations (illustration of a cat and illustration of a dog).

The user A and the user B can intuitively know that there is crosswise pairing generated and the communication terminal 200a and the data terminal 300b as well as the communication terminal 200b and the data terminal 300a which are unintended combinations are to be paired, through checking that the illustration 621 and the illustration 631 are not the same.

As shown in FIG. 7C, the user A operates the image switching button 632 or 633 to switch the illustration 631 displayed on the display 611 of the data terminal 300a so that the illustration becomes the same as the illustration 621 displayed on the display 601 of the communication terminal 200a. In the same manner, the user B also switches the illustration 631 displayed on the display 611 of the data terminal 300b so that the illustration becomes the same as the illustration 621 displayed on the display of the communication terminal 200b.

When the user A and the user B push the OK button 634 in that state, it is possible to inform the pairing management device 100 that the tentative pair of the communication terminal 200a and the data terminal 300b and the tentative pair of the communication terminal 200b and the data terminal 300a are wrong combinations, and the correct combinations are the communication terminal 200a and the data terminal 300a as well as the communication terminal 200b and the data terminal 300b. Thereby, the pairing management device 100 alters the crosswise state, and forms the final pairs as shown in FIG. 7D with the informed correct combinations to complete the pairing.

It is assumed here that the user B is an ill-willed user, and intends to steal the data held by the user A unlawfully by pairing the own communication terminal 200b with the data terminal 300a of the user A. In that case, the OK button 634 is pushed while the same illustration 631 as the illustration 621 displayed on the display 601 of the communication terminal 200a of the user A is displayed on the display 611 of the data terminal 300b.

However, in that case, the same illustrations 631 are transmitted from the data terminal 300a and the data terminal 300b to the pairing management device 101 as the same pair alteration data 415. When duplication of the pair alteration data 415 is detected in the processing of step S523, the pairing management device 100 does not form the final pair. Thus, the communication terminal 200b of the user B cannot be paired with the data terminal 300a of the user A.

FIG. 8 is an illustration of an image showing another example of the pair confirmation data 450 and 460 shown in FIG. 6B. The pair confirmation data 450 and 460 may not necessarily need to be the data showing the same displays on the communication terminal 200a and the data terminal 300a as long as it is possible to confirm the one-on-one correspondence. In this case, not an illustration but a text message for requesting to display a specific image on the display of the data terminal 300a is displayed on the display 601 of the communication terminal 200a.

At that time, the pair confirmation data 460 including an image (Japanese flag) requested in the text message on the display 601 and a plurality of images (flags of a plurality of countries other than Japan) which evidently do not correspond to the text message is transmitted to the data terminal 300a. The user A may operate the image switching button 632 or 633 to switch the illustration displayed on the display 611 of the data terminal 300a, and push the OK button 634 when it is changed to the illustration requested by the text message on the display 601.

In the actions described above, the operation executed by the user A and the user B is a simple operation which is to push the button displayed on the respective input-output modules of the communication terminal 200 and the data terminal 300 and to compare the pair confirmation data displayed on the communication terminal 200 and the data terminal 300. Therefore, the first issue described above can be overcome.

Further, there is a possibility that the tentative pairs generated at the stage of step S312 be in a crosswise state. However, it is possible to eliminate the crosswise state by the following actions of pair confirmation and final pair update, and to easily establish the pairs in the combinations intended by the user. Thereby, the second issue described above can be overcome.

Further, even if the initial pairing fails, pairing can be retried with a completely same simple operation. At that time, whether or to register the tentative pairs is determined with "long push" with which the generation probability of the crosswise pairing can be reduced compared to the case of "simultaneous push", so that the probability for the user to repeat the same mistake can be reduced. Therefore, the third issue described above can be overcome.

Furthermore, the actions depicted heretofore do not require any special hardware. It is simply required for both the communication terminals 200 and the data terminals 300 to include the input-output module, the storage device, and the communication function, and to be capable of making access to the pairing management device 100. Further, the pairing management device 100 simply needs to include the storage device, the communication function, and the timer. Therefore, the fourth issue described above can be overcome.

With the exemplary embodiment, the pair confirmation operation is performed on the data terminal 300 side. However, this is done so considering the fact that the processing capacity, the storage capacitance, and the data transfer speed of the communication terminal 200 in many cases are inferior to those of the data terminal 300 in transmitting and displaying the pair confirmation data 450 and 460. Thus, it is of course fine to perform the pair confirmation operation on the communication terminal 200 side or to perform the pair confirmation operation on both sides of the communication terminal 200 and the data terminal 300.

Through pairing the communication terminal 200 and the data terminal 300 with the above-described structures, followings can be done, for example. The user A in the workplace pairs the communication terminal 200a that is a mobile phone or a fixed-line phone with the data terminal 300a that is a desktop PC or a notebook PC in advance by the method of the exemplary embodiment. In the same manner, the user B also pairs the communication terminal 200b with the data terminal 300b in advance.

Thereby, when the user A and the user B talk with the communication terminals 200a and 200b, the data terminals 300a and 300b can start sharing of electronic data. The user B may or may not be a partner which is within the same workplace as the user A, as long as the communication terminal 200b and the data terminal 300b of the user B are accessible to the same pairing management device 100 as that of the user A via an IP net.

Even in a case where the user A and the user B do not pair the communication terminal and the data terminal in advance, the user A may request to the user B to pair the communication terminal 200b with the data terminal 300b verbally at a point where the user A wishes to start sharing of data such as electronic data with the user B and the user A oneself then starts the pairing of the communication terminal 200a and the data terminal 300b.

As has been described above, it is possible with the exemplary embodiment of the invention to provide the simple pairing system without imposing large load on the user when conducting a pairing work. The reason is that the user does not need to manually input the terminal discriminating number of the own communication terminal, and the pairing work can be done by simply pushing the pairing execution buttons displayed respectively on the screens of the own communication terminal and data terminal almost simultaneously by adjusting the timings, for example.

Further, it is possible with the exemplary embodiment of the invention to provide the safe pairing system with which the user can intuitively know whether or not pairing can be done with the intended terminals before the pairing, so that the pairing between the intended terminals can be guaranteed by correcting the pairing when the pairing is not to be conducted with the intended terminal. The reason is that it is possible to know whether or not a crosswise pairing is to be generated by judging the consistency of the pair confirmation data displayed respectively on the screens of the communication terminal and the data terminal when there is a pairing request. When it is found that the crosswise pairing is to be generated, it can be avoided by simply changing the pair confirmation data displayed on the screen of the data terminal to be consistent with the confirmation data displayed on the screen of the communication terminal.

Furthermore, it is possible with the exemplary embodiment of the invention to provide the secure pairing system which can increase the pairing success probability for the retry of the second time and thereafter, when the initial pairing fails. The reason is that it is possible to decrease the probability of having the crosswise pairing by conducting "long push" or "rhythm push" for the retry of the second time and thereafter, when the initial pairing with "simultaneous push" fails.

Moreover, it is possible with the exemplary embodiment of the invention to provide the inexpensive pairing system which is capable of conducting pairing with the terminals that do not include any special devices such as a close-distance communication and camera. The reason is that pairing can be done with any terminals having a screen and an IP communication function, so that no special device is necessary.

With the technical effects described above, the user can select any communication terminals and data terminals at hand ad hoc, and pair those easily, safely, securely, and inexpensively.

Further, the exemplary embodiment of the invention makes it possible for the users to communicate to have mutual understanding by simultaneously utilizing data sharing in addition to aural communications. For example, when the user within a workplace is at the own seat of one's room, the user can start data sharing of the electronic data with a partner with a desktop PC immediately at the start of communication with a radio LAN mobile phone or at an arbitrary timing during conversation through pairing the radio LAN mobile phone with the desktop PC in advance by using the pairing system according to the exemplary embodiment of the invention. When the user is out to another place within the workplace by carrying the radio LAN mobile phone and a notebook PC, data sharing can be started when starting conversation or during conversation by pairing the radio LAN mobile phone with the notebook PC.

The communication terminal and the data terminal may also be paired ad hoc at a point where the user wishes to start data sharing of the electronic data and the like with a partner during a conversation with the communication terminal without pairing the communication terminal with the data terminal in advance. If the partner has not conducted pairing of the terminals, either, the user may verbally request the partner to pair the communication terminal with the data terminal ad hoc. For starting data sharing between the data terminals with the partner of the conversation, the method depicted in Patent Document 1 may be utilized.

Further, in a case where the user within the workplace is at the own seat of one's room and wishes to start data sharing of the electronic data saved in the desktop PC placed on the desk during a conversation using a fixed-line phone placed at the own seat, the user may pair the fixed-line phone with the desktop PC. When the user wishes to start data sharing of the electronic data saved in a notebook PC at hand, the user may pair the fixed-line phone with the notebook PC.

Further, when the user within the workplace carries only the radio LAN mobile phone and stops at an in-office shared PC station where PCs that can be used freely are placed, the carried radio LAN mobile phone can be paired ad hoc with the shared PC in use.

Furthermore, when the user within the workplace carries only a notebook PC to go out to another place within the workplace and temporarily uses a vacant seat or a shared seat, the user can pair the fixed-line phone placed at that seat with the notebook PC ad hoc.

Moreover, when a domestic user wishes to start data sharing of digital photographs with a partner during a conversation on a mobile phone, the user may pair the own mobile phone with a PC shared within the family placed at a living room when the user is in the living room and may pair the own PC placed at the user's room when the user is in the own room. Further, when the domestic user carries only the mobile phone and stops at an Internet café, the user can pair the carried mobile phone with a PC used in the Internet café ad hoc.

Those described above are not limited to the users at work but also can be done by users at home. Further, a user who is carrying only a mobile phone can pair the mobile phone with a temporarily useable PC that is placed at a place such as a shared station at workplaces or at an Internet café.

Second Exemplary Embodiment

A second exemplary embodiment of the invention is the same as the case of the first exemplary embodiment described above in terms of the structures of the devices, and most of the processing to be executed is the same as the case of the first exemplary embodiment. Therefore, only the different points with respect to the case of the first exemplary embodiment will be described.

In the second exemplary embodiment of the invention, "rhythm push" is requested to the user instead of requesting "long push" for a retry of pairing shown in step S530 and thereafter of FIG. 4 and FIG. 5. "Rhythm push" is to press down a button according to a different pressing pattern as in the Morse signals, such as "dot dot dash" or "dash dash dot".

The pairing control module 101 in step S530 of FIG. 5 informs all the communication terminals 200 and data terminals 300 specified by the communication terminal identifiers 412 and the data terminal identifiers 413 of each tentative pair 411 that pairing has failed and it is necessary to retry the pairing operation with rhythm push.

At this time, different press-down patterns of the rhythm push are informed to each of the data terminals 300. However, the number of pressing the button is the same. For example, when the button pressing number is three times, a press-down pattern such as "dot dot dash (• • -)" is informed to the data terminal 300a, while "dash dash dot (- - •)" or the like is informed to the data terminal 300b. The number of pressing or the press-down pattern may also be those other than this example.

The pairing execution buttons are displayed respectively on the input-output modules 212 of the communication terminals 200a, 200b and on the input-output modules 322 of the data terminals 300a, 300b. The user A repeats actions of pushing and releasing the pairing execution buttons displayed on the input-output module 212 of the communication terminals 200a and the input-output module 322 of the data terminal 300a almost simultaneously by adjusting the timings according to the press-down pattern informed in step S530. The user B also performs the same operation for the input-output module 212 of the communication terminal 200b and the input-output module 322 of the data terminal 300b. At that time, the press-down pattern may be displayed on the screen of the input-output module 322.

The pairing control module 101 receives such pairing requests (step S531), and performs the same processing as the processing executed in step S510 described above (step S540). Note, however, that "rhythm push" is stored as the value of the request type 401 of the pairing request 400. Further, when the number of pressing the button is three times, six sets of the button operation type 405 and the operation relative time 406 are added to each request type 401.

In the button operation types 405 of the first to six sets, the values are alternately stored as in "button down", "button up", "button down", "button up", "button down, and "button up, respectively. In the operation relative time 406 of first set, "0" is stored, while a time difference between the time at which the pairing execution button is pushed (or released) previously in each of the terminals and time at which the button is pushed (or released) this time is stored in the operation relative time 406 of the second to sixth sets.

For example, in a case where the button is released after 200 miliseconds from the time at which the button is pushed initially, the button is pushed 500 miliseconds after that point, the button is released 200 miliseconds after that point, the button is pushed 500 miliseconds after that point, and the button is released 800 miliseconds after that point (this corresponds to the press-down pattern of "dot dot dash"), values of "0", "200", "500", "200", "500", and "800" are stored respectively to the operation relative time 406 of the first to sixth sets.

Subsequently, the pairing control module 101 judges whether or not it is possible to generate retry tentative pairs from the pairing requests 400 received during the pairing reception period in step S540 (step S541). At that time, the pairing control module 101 extracts all the requests whose value of the request type 401 is "rhythm push" among the pairing requests 400 received during the pairing reception period.

For each of the extracted pairing requests 400, the time obtained by subtracting the value of the sixth-set of the operation relative time 406 from the received time 404, the time obtained by subtracting the value of the fifth-set operation relative time 406 from the time obtained thereby, the time obtained by subtracting the value of the fourth-set operation relative time 406 from the time obtained thereby, the time obtained by subtracting the value of the third-set operation relative time 406 from the time obtained thereby, and the time obtained by subtracting the value of the second-set operation relative time 406 from the time obtained thereby are calculated, and those whose errors in five obtained times between each of the pairing requests 400 are all within a prescribed value or less are put into a group. The error herein is typically an extremely short time such as 500 miliseconds. However, the value is not limited only to that.

The processing after step S514 is the same as the case of the first exemplary embodiment, so that explanations thereof are omitted. While "rhythm push" requires a troublesome work operation, the number of judgment standards is increased further compared to the case of "long push", such as the simultaneousness of the time at which the buttons are pushed and the simultaneousness of the time at which the buttons are released. Since it is required to clear all of those judgment standards, the probability of having crosswise pairing can be decreased further.

While the present invention has been described by referring to the specific embodiments shown in the drawings, the present invention is not limited to the embodiment shown in the drawings. It is to be understood that any known structures can be employed, as long as the effect of the present invention can be achieved therewith.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application claims the Priority right based on Japanese Patent Application No. 2007-289414 filed on Nov. 7, 2007 and the disclosure thereof is hereby incorporated by reference in its entirety.

INDUSTRIAL APPLICABILITY

The present invention makes it possible to pair a telephone and a PC at hand ad hoc. Therefore, it is possible with the present invention to create a value-added service for telephone service of only with aural communication, which is directed to in-house network SI provider, communication provider, and ISP provider.

BRIEF DESCRIPTION OF THE DRAWINGS

FIG. 5 is a flowchart showing details of processing disclosed in step S530 of FIG. 4, which is executed by the pairing management device when retrying a pairing operation of the communication terminal and the data terminal;

REFERENCE NUMERALS

Figure 1:
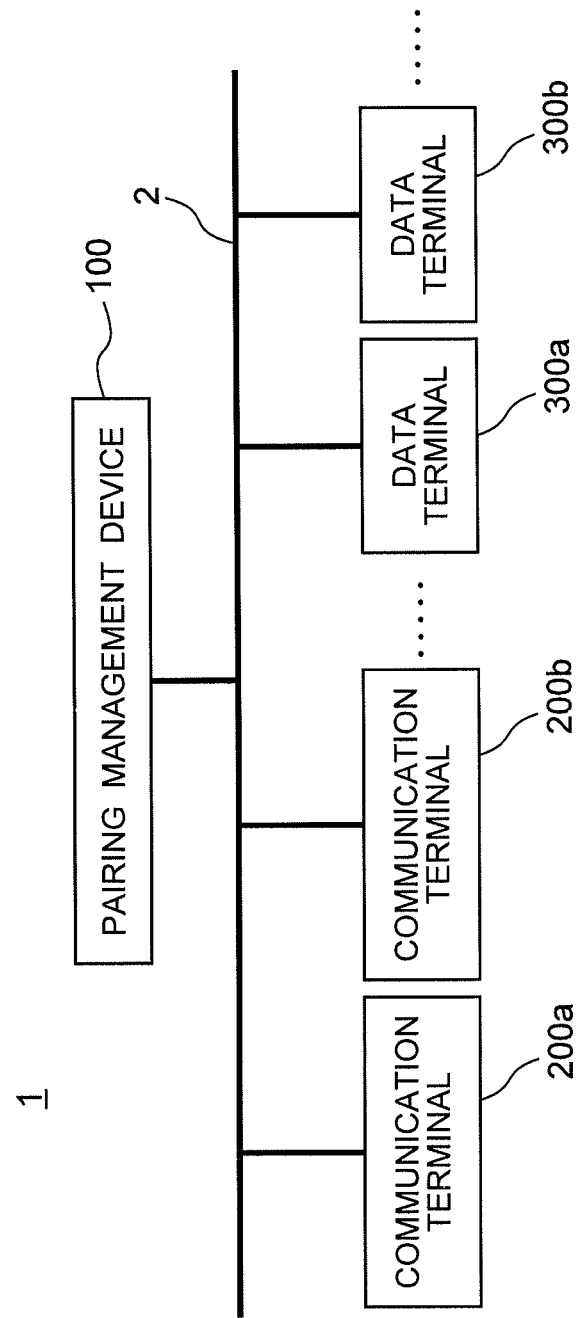
FIG. 1 is a block diagram showing the structure of a network according to a first exemplary embodiment of the invention.
Figure 2:
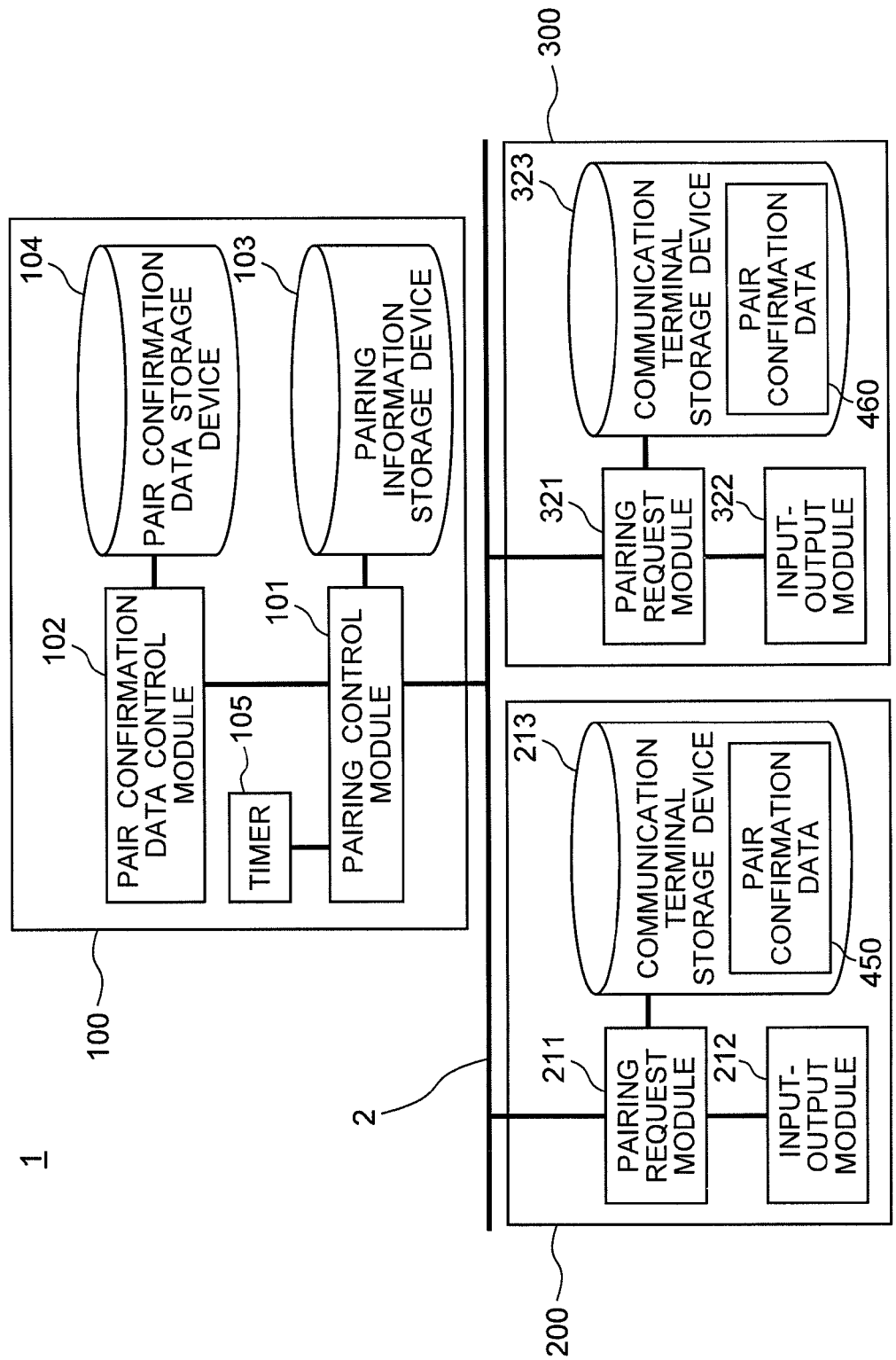
FIG. 2 is a block diagram showing each structure of a pairing management device, a communication terminal, and a data terminal disclosed in FIG. 1.
Figure 3:
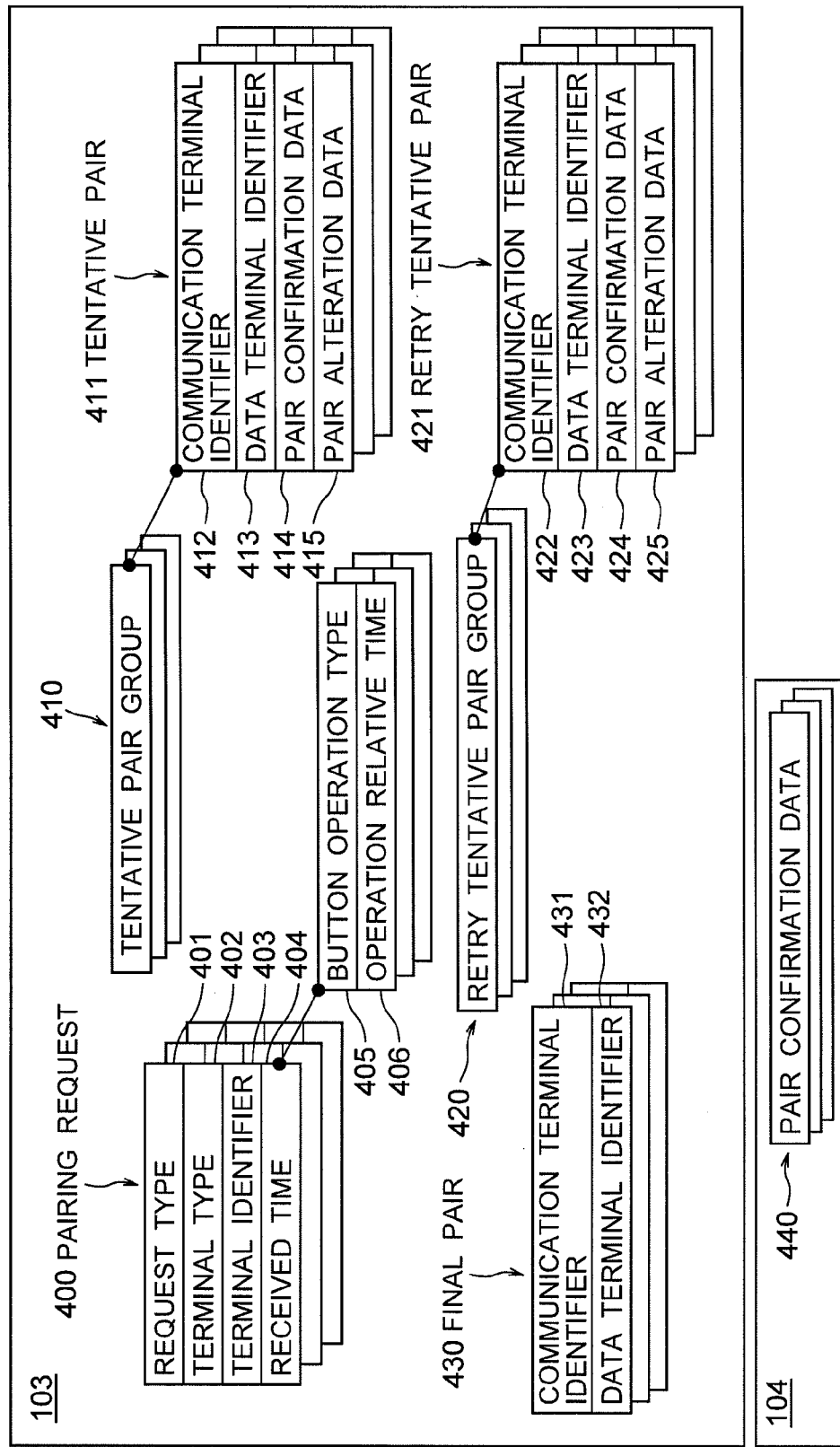
FIG. 3 is a block diagram showing the structure of data stored in a pairing information storage device and a pair confirmation data storage device disclosed in FIG. 2.
Figure 4:
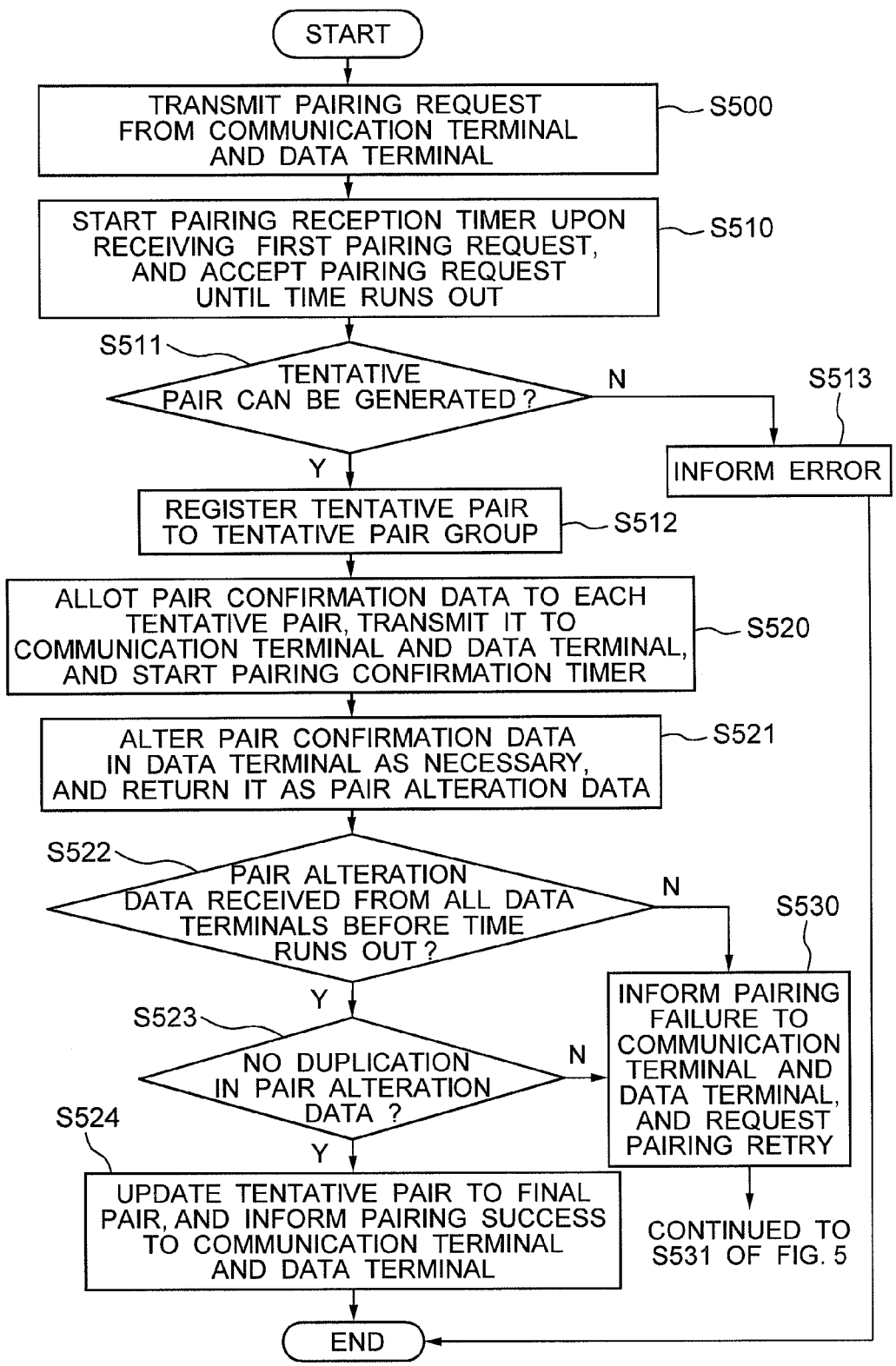
FIG. 4 is a flowchart showing processing executed when the pairing management device disclosed in FIG. 1 pairs the communication terminal with the data terminal.
Figure 6A:
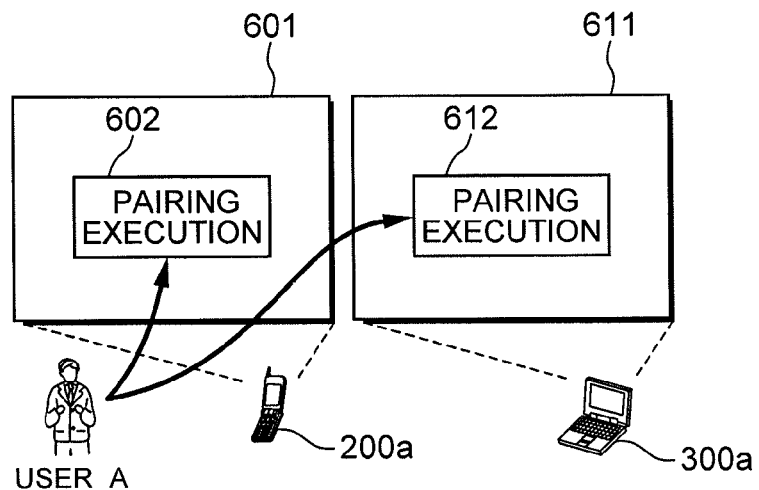
FIG. 6 shows illustrations of images showing screen transition and operation of the communication terminal and the data terminal in regards to the flowcharts shown in FIG. 4 and FIG. 5.
Figure 6B:
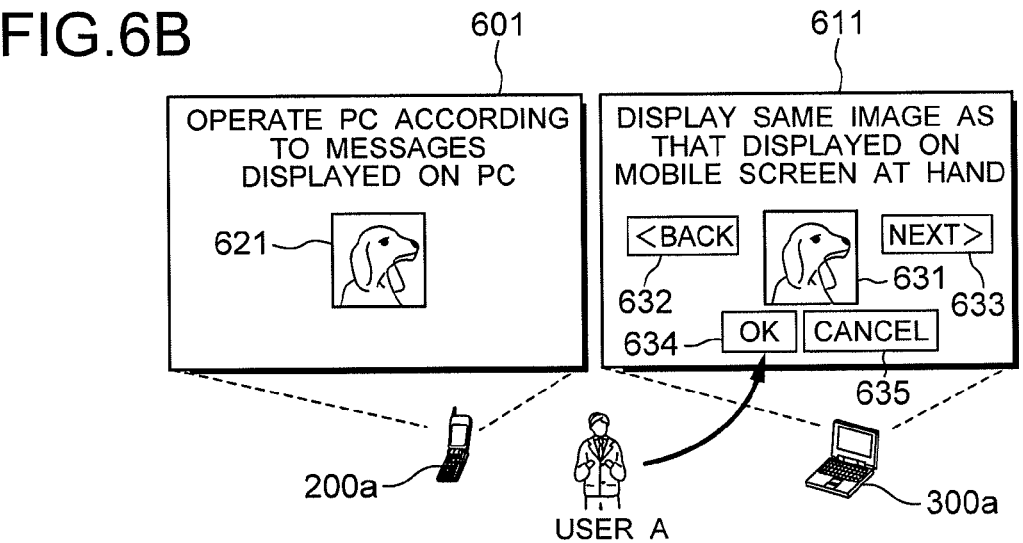
Figure 6C:
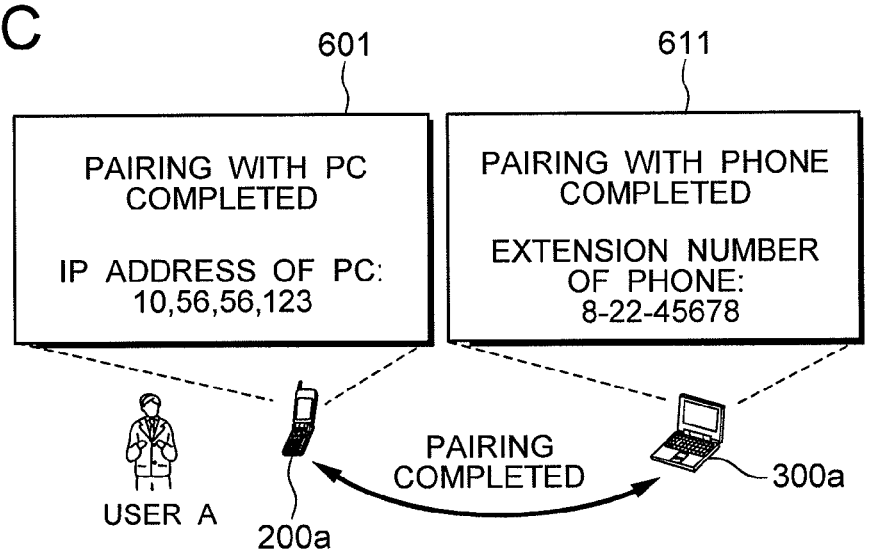
Figure 7A:
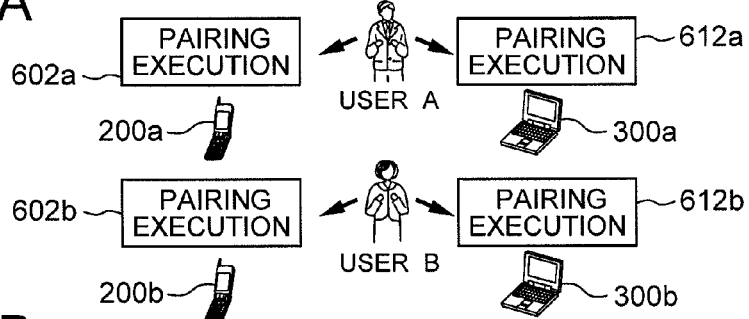
FIG. 7 shows illustrations of images showing screen transition and operation of the communication terminal and the data terminal in regards to the flowchart shown in FIG. 4 and FIG. 5.
Figure 7B:
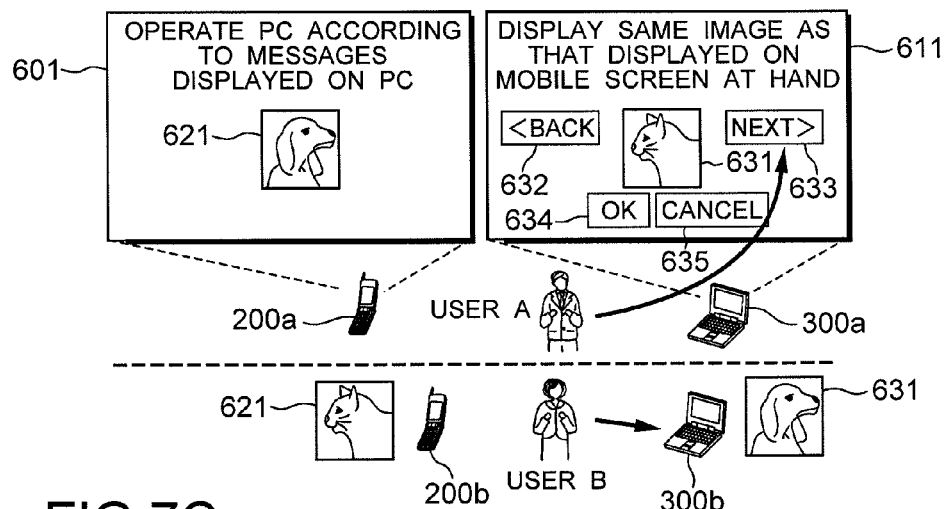
Figure 7C:
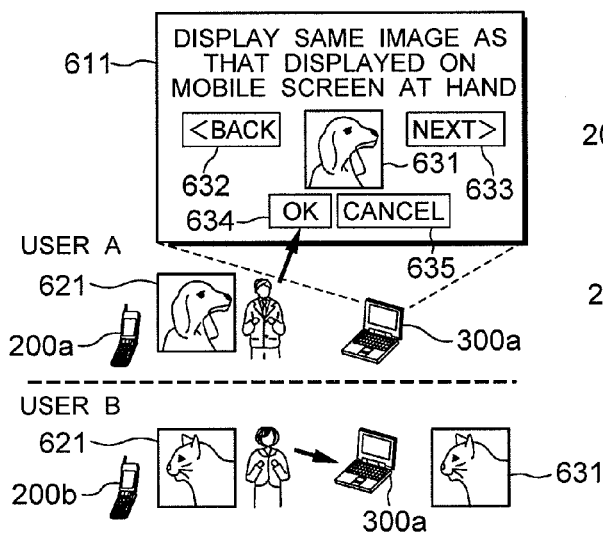
Figure 7D:
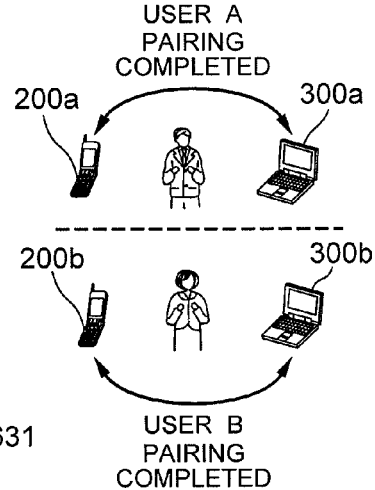
Figure 8:
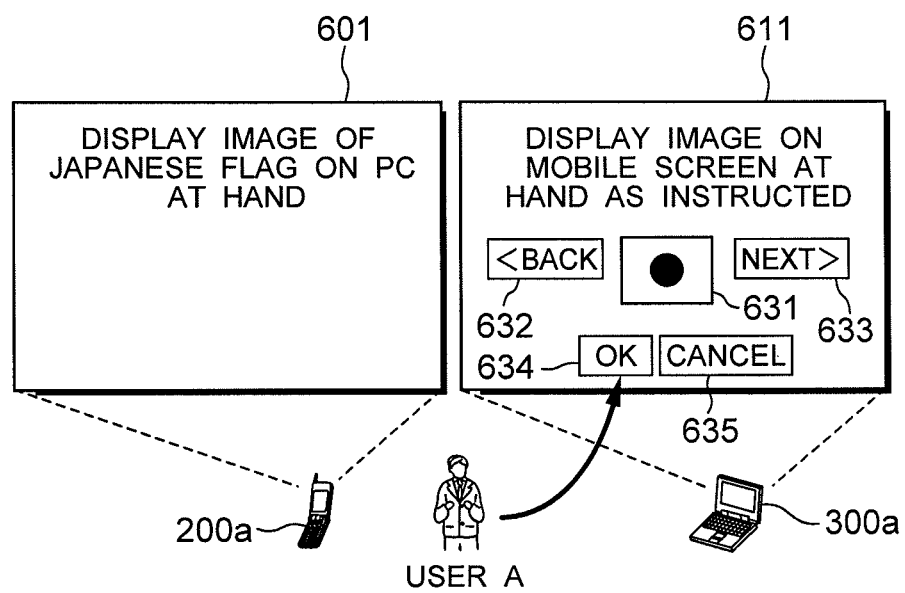
FIG. 8 shows an illustration of an image showing another example of pair confirmation data displayed in FIG. 6B.

1 Network system
2 Network
100 Pairing management device
101 Pairing control module
102 Pair confirmation data control module
105 Timer
200 Communication terminal
211 Pairing request module
212 Input-output module
300 Data terminal
321 Pairing request module
322 Input-output module
400 Pairing request
411 Tentative pair
414, 440 Pair confirmation data
415 Pair alteration data
421 Retry tentative pair
430 Final pair

The invention claimed is:

1. A pairing system which enables cooperation of communication terminals with data terminals on one-on-one basis to form pairs in a network system in which a plurality of communication terminals, a plurality of data terminals, and at least one pairing management device are connected mutually, and enables sharing of a voice communication and data via the network system between the pairs, wherein:

each of both the communication terminals and the data terminals comprises an input-output module and a pairing request module which transmits a pairing request to the pairing management device;

the pairing management device comprises:
 a pairing control module which receives the pairing requests from the communication terminals and the data terminals, generates tentative pairs from the communication terminals and the data terminals which transmitted the pairing requests, and stores the tentative pairs in a pairing information storage device included in the pairing management device as a tentative pair group containing a communication terminal identifier and a data terminal identifier;
 a pair confirmation data storage device which stores a plurality of pieces of pair confirmation data in advance, the pair confirmation data corresponding on one-on-one basis to the communication terminals and the data terminals forming the tentative pairs; and
 a confirmation data control module which allots and transmits to the communication terminals and the data terminals, pair confirmation data which corresponds on one-on-one basis to the communication terminals and the data terminals forming the tentative pairs from the plurality of pieces of the pair confirmation data stored in the pair confirmation data storage device;

the input-output modules of both the communication terminals and the data terminals forming the tentative pairs output the pair confirmation data, respectively, to confirm that the communication terminal and the data terminal of different owners are not paired;

the pairing request module of at least either the communication terminals or the data terminals forming the tentative pairs comprise a transmission section which transmits pair alteration data corresponding to the pair confirmation data to the pairing management device; and when the pairing control module in the pairing management device receives the pair alteration data from the communication terminals or the data terminals forming the tentative pairs, the tentative pairs are updated to final pairs.

2. The pairing system as claimed in claim 1, wherein the pairing management device comprises a timer; and the pairing control module generates the tentative pairs from the communication terminals and the data terminals from which the pairing requests are received, while the timer counts a first period.

3. The pairing system as claimed in claim 2, wherein in the pairing management device, the pairing control module updates the tentative pairs to the final pairs upon receiving the pair alteration data from the communication terminals or the data terminals forming the tentative pairs while the timer counts a second period.

4. The pairing system as claimed in claim 2, wherein the pair confirmation data corresponds to at least one selected from a text, a still image, a voice, and a moving image.

5. The pairing system as claimed in claim 2, wherein in the pairing management device, the pair confirmation data control module allots the pair confirmation data whose contents are different from each other to a plurality of sets of the generated tentative pairs.

6. The pairing system as claimed in claim 5, wherein in the pairing management device, the pairing control module transmits the pair confirmation data allotted to the tentative pair to at least one of the communication terminal and the data terminal forming the tentative pair and the pair confirmation data allotted to other tentative pairs simultaneously.

7. The pairing system as claimed in claim 6, wherein:
in the communication terminal or the data terminal forming the tentative pair,
the input-output module displays the pair confirmation data displayed by switching it to the pair confirmation data allotted to the other tentative pairs; and
the pairing request module transmits pair alteration data corresponding to the switched and displayed pair confirmation data to the pairing management device.

8. The pairing system as claimed in claim 7, wherein
in the pairing management device, the pairing control module alters combination of the communication terminal and the data terminal of the tentative pair to update the tentative pair to a final pair based on the pair alteration data received from the communication terminal or the data terminal forming the tentative pair.

9. The pairing system as claimed in claim 5, wherein
in the pairing management device, the pairing control module updates the tentative pair to a final pair when the pair alteration data received from the communication terminal or the data terminal forming the tentative pair while the timer counts a second period is not duplication.

10. The pairing system as claimed in claim 2, wherein
the communication terminal or the data terminal forming the tentative pair transmits a response indicating that the pairing is stopped to the pairing management device after displaying the pair confirmation data.

11. The pairing system as claimed in claim 2, wherein
in the pairing management device, the pairing control module takes the communication terminal and the data terminal as a retry tentative pair, when pairing request buttons are pushed during a third period in both the communication terminal and the data terminal whose update from the tentative pair to the final pair has failed, and the pairing request buttons are released during a forth period in both the communication terminal and the data terminal.

12. A pairing management device which enables cooperation of communication terminals with data terminals on one-on-one basis to form pairs in a network system in which a plurality of communication terminals, a plurality of data terminals, and at least one pairing management device are connected mutually, and enables sharing of a voice communication and data via the network system between the pairs, the pairing management device comprising:
a pairing control module which receives pairing requests from the communication terminals and the data terminals, generates tentative pairs from the communication terminals and the data terminals which transmitted the pairing requests, and stores the tentative pairs in a pairing information storage device included in the pairing management device as a tentative pair group containing a communication terminal identifier and a data terminal identifier;
a pair confirmation data storage device which stores a plurality of pieces of pair confirmation data in advance, the pair confirmation data corresponding on one-on-one basis to the communication terminals and the data terminals forming the tentative pairs; and
a pair confirmation data control module which allots and transmits to the communication terminals and the data terminals, pair confirmation data which corresponds on one-on-one basis to the communication terminals and the data terminals forming the tentative pairs from the plurality of pieces of the pair confirmation data stored in the pair confirmation data storage device,
wherein when the pairing control module receives pair alteration data from the communication terminals or the data terminals forming the tentative pairs, the tentative pairs are updated to final pairs, and
wherein the pair confirmation data confirms that the communication terminal and the data terminal of different owners are not paired.

13. The pairing management device as claimed in claim 12, wherein
the pairing control module generates the tentative pairs from the communication terminals and the data terminals from which the pairing requests are received, while a timer provided in advance counts a first period.

14. The pairing management device as claimed in claim 13, wherein
the pairing control module updates the tentative pairs to the final pairs upon receiving the pair alteration data from the communication terminals or the data terminals forming the tentative pairs while the timer counts a second period.

15. The pairing management device as claimed in claim 13, wherein
the pair confirmation data corresponds to at least one elected from a text, a still image, a voice, and a moving image.

16. The pairing management device as claimed in claim 13, wherein
the pair confirmation data control module allots the pair confirmation data whose contents are different from each other to a plurality of sets of the generated tentative pairs.

17. The pairing management device as claimed in claim 16, wherein
the pairing control module transmits the pair confirmation data allotted to the tentative pair to at least one of the communication terminal and the data terminal forming the tentative pair and the pair confirmation data allotted to other tentative pairs simultaneously.

18. The pairing management device as claimed in claim 17, wherein
the pairing control module alters combination of the communication terminal and the data terminal of the tentative pair to update the tentative pair to an final pair based on the pair alteration data received from the communication terminal or the data terminal forming the tentative pair.

19. The pairing management device as claimed in claim 16, wherein
the pairing control module updates the tentative pair to a final pair when the pair alteration data received from the communication terminal or the data terminal forming the tentative pair while the timer counts a second period is not duplication.

20. The pairing management device as claimed in claim 13, wherein
the pairing control module takes the communication terminal and the data terminal as a retry tentative pair, when pairing request buttons are pushed during a third period in both the communication terminal and the data terminal whose update from the tentative pair to the final pair has failed, and the pairing request buttons are released during a fourth period in both the communication terminal and the data terminal.

21. A pairing method which enables cooperation of communication terminals with data terminals on one-on-one basis to form pairs in a network system in which a plurality of communication terminals, a plurality of data terminals, and at least one pairing management device are connected mutually, and enables sharing of a voice communication and data via the network system between the pairs, the method comprising:
- a pairing request operation in which the communication terminals and the data terminals transmit pairing requests to the pairing management device;
- a tentative pair generating operation in which the pairing management device receives the pairing requests from the communication terminals and the data terminals, generates tentative pairs from the communication terminals and the data terminals transmitted the pairing requests, and stores the tentative pairs in a pairing information storage device included in the pairing management device as a tentative pair group containing a communication terminal identifier and a data terminal identifier;
- a storing operation in which a plurality of pieces of pair confirmation data is stored in advance in a pair confirmation data storage device, the pair confirmation data corresponding on one-on-one basis to the communication terminals and the data terminals forming the tentative pairs; and
- a pair confirmation data transmitting operation in which the pairing management device allots and transmits to the communication terminals and the data terminals, pair confirmation data which corresponds on one-on-one basis to the communication terminals and the data terminals forming the tentative pairs from the plurality of pieces of the pair confirmation data stored in the pair confirmation data storage device;
- a pair confirmation data output operation in which the communication terminals and the data terminals forming the tentative pairs receive and output the pair confirmation data to confirm that the communication terminal and the data terminal of different owners are not paired;
- a pair alteration data transmitting operation in which either the communication terminals or the data terminals forming the tentative pairs transmit pair alteration data corresponding to the pair confirmation data to the pairing management device; and
- a final pair update operation in which the pairing management device updates the tentative pairs to final pairs, when the pairing control module in the pairing management device receives the pair alteration data from the communication terminals or the data terminals forming the tentative pairs.

22. The pairing method as claimed in claim 21, wherein:
the pairing management device comprises a timer; and
in the tentative pair generating operation, the pairing control module generates the tentative pairs from the communication terminals and the data terminals from which the pairing requests are received, while the timer counts a first period.

23. The pairing method as claimed in claim 22, wherein:
in the final pair update operation, the pairing control module updates the tentative pairs to the final pairs upon receiving the pair alteration data from the communication terminals or the data terminals forming the tentative pairs while the timer counts a second period.

24. A non-transitory computer readable recording medium storing a pairing program causing a computer, which forms a pairing management device that enables cooperation of communication terminals with data terminals on one-on-one basis to form pairs in a network system in which a plurality of communication terminals, a plurality of data terminals, and at least one pairing management device are connected mutually, and enables sharing of a voice communication and data via the network system between the pairs, to execute:
- processing which receives the pairing requests from the communication terminals and the data terminals, generates tentative pairs from the communication terminals and the data terminals transmitted the pairing requests, and stores the tentative pairs in a pairing information storage device included in the pairing management device as a tentative pair group containing a communication terminal identifier and a data terminal identifier;
- processing which stores a plurality of pieces of pair confirmation data in a pair confirmation storage device in advance, the pair confirmation data corresponding on one-on-one basis to the communication terminals and the data terminals forming the tentative pairs; and
- processing which allots and transmits to the communication terminals and the data terminals, pair confirmation data which corresponds on one-on-one basis to the communication terminals and the data terminals forming the tentative pairs from the plurality of pieces of the pair confirmation data stored in the pair confirmation data storage device; and
- processing which updates the tentative pairs to final pairs, upon receiving the pair alteration data from the communication terminals or the data terminals forming the tentative pairs,
wherein the pair confirmation data confirms that the communication terminal and the data terminal of different owners are not paired.

25. The non-transitory computer readable recording medium storing the pairing program as claimed in claim 24, wherein:
the computer comprises a timer; and
in the processing which generates the tentative pairs, the tentative pairs are generated from the communication terminals and the data terminals from which the pairing requests are received while the timer counts a first period.

26. A pairing system which enables cooperation of communication terminals with data terminals on one-on-one basis to form pairs in a network system in which a plurality of communication terminals, a plurality of data terminals, and at least one pairing management device are connected mutually, and enables sharing of a voice communication and data via the network system between the pairs, wherein:
each of both the communication terminals and the data terminals comprises an input-output module and pairing request means for transmitting a pairing request to the pairing management device;
the pairing management device comprises:
pairing control means for receiving the pairing requests from the communication terminals and the data terminals, generating tentative pairs from the communication terminals and the data terminals which transmitted the pairing requests, and storing the tentative pairs in a pairing information storage device included in the pairing management device as a tentative pair group containing a communication terminal identifier and a data terminal identifier,
a pair confirmation data storage means which stores a plurality of pieces of pair confirmation data in advance, the pair confirmation data corresponding on one-on-one basis to the communication terminals and the data terminals forming the tentative pairs; and confirmation data control means for allotting and transmitting to the communication terminals and the data terminals, pair confirmation data which corresponds on one-on-one basis to the communication terminals and the data terminals forming the tentative pairs from the plurality of pieces of the pair confirmation data stored in the pair confirmation data storage means;

the input-output modules of both the communication terminals and the data terminals forming the tentative pairs output the pair confirmation data, respectively, to confirm that the communication terminal and the data terminal of different owners are not paired;

the pairing request means of at least either the communication terminals or the data terminals forming the tentative pairs comprise transmission means for transmitting pair alteration data corresponding to the pair confirmation data to the pairing management device; and when the pairing control means in the pairing management device receives the pair alteration data from the communication terminals or the data terminals forming the tentative pairs, the tentative pairs are updated to final pairs.

27. A pairing management device which enables cooperation of communication terminals with data terminals on one-on-one basis to form pairs in a network system in which a plurality of communication terminals, a plurality of data terminals, and at least one pairing management device are connected mutually, and enables sharing of a voice communication and data via the network system between the pairs, the pairing management device comprising:

pairing control means for receiving pairing requests from the communication terminals and the data terminals, generating tentative pairs from the communication terminals and the data terminals which transmitted the pairing requests, and storing the tentative pairs in a pairing information storage device included in the pairing management device as a tentative pair group containing a communication terminal identifier and a data terminal identifier;

a pair confirmation data storage means which stores a plurality of pieces of pair confirmation data in advance, the pair confirmation data corresponding on one-on-one basis to the communication terminals and the data terminals forming the tentative pairs; and pair confirmation data control means for allotting and transmitting to the communication terminals and the data terminals, pair confirmation data which corresponds on one-on-one basis to the communication terminals and the data terminals forming the tentative pairs from the plurality of pieces of the pair confirmation data stored in the pair confirmation data storage means, wherein when the pairing control means receives pair alteration data from the communication terminals or the data terminals forming the tentative pairs, the tentative pairs are updated to final pairs, wherein the pair confirmation data confirms that the communication terminal and the data terminal of different owners are not paired.

* * * * *